United States Patent
Voelkl et al.

(10) Patent No.: US 12,458,033 B2
(45) Date of Patent: Nov. 4, 2025

(54) CUTTING MACHINE AND METHOD FOR SLICING A LOAF INTO SLICES

(71) Applicant: TVI ENTWICKLUNG & PRODUKTION GMBH, Bruckmuehl (DE)

(72) Inventors: Thomas Voelkl, Bruckmuehl (DE); Dominik Rothenaichner, Bruckmuehl (DE)

(73) Assignee: TVI Entwicklung & Produktion GmbH, Bruckmuehl (DE)

( * ) Notice: Subject to any disclaimer, the term of this patent is extended or adjusted under 35 U.S.C. 154(b) by 1053 days.

(21) Appl. No.: 17/604,409

(22) PCT Filed: Apr. 16, 2020

(86) PCT No.: PCT/EP2020/060684
§ 371 (c)(1),
(2) Date: May 31, 2022

(87) PCT Pub. No.: WO2020/212475
PCT Pub. Date: Oct. 22, 2020

(65) Prior Publication Data
US 2022/0304318 A1     Sep. 29, 2022

(30) Foreign Application Priority Data
Apr. 16, 2019   (DE) .................. 102019110026.7

(51) Int. Cl.
*A22C 17/00*     (2006.01)
*B26D 7/01*      (2006.01)
*B26D 7/06*      (2006.01)

(52) U.S. Cl.
CPC ............ *A22C 17/0033* (2013.01); *B26D 7/01* (2013.01); *B26D 7/0608* (2013.01); *B26D 2210/02* (2013.01)

(58) Field of Classification Search
CPC ..... A22C 17/0033; B26D 7/01; B26D 7/0608
See application file for complete search history.

(56) References Cited

U.S. PATENT DOCUMENTS 1,645,551 A * 10/1927 Stukart .................. B26D 1/157
                                                            83/490
4,548,108 A * 10/1985 Dennis .................... B26D 5/32
                                                             83/13
(Continued)

FOREIGN PATENT DOCUMENTS

CN          1417009 A      5/2003
CN        101003134 A      7/2007
(Continued)

OTHER PUBLICATIONS

Chinese Office Action (with English Machine Translation), Dated Aug. 25, 2022, Application No. 202080028659.1, Applicant TVI Development & Production Co., 13 Pages.
(Continued)

*Primary Examiner* — Adam J Eiseman
*Assistant Examiner* — Richard D Crosby, Jr.
(74) *Attorney, Agent, or Firm* — Brooks Kushman P.C.

(57) ABSTRACT

A cutting machine for slicing a loaf into slices includes a forming tube channel extending in an axial direction, with an open longitudinal side and a channel cavity. A plurality of cross press stamps of different widths can each be inserted into the open longitudinal side of the forming tube channel for forming a forming tube having a rear end and a cutting end. The cutting machine further includes a cutting device with a blade arranged in front of the cutting end of the forming tube, and the blade is displaceable in a transverse direction relative to the forming tube. A width of the channel cavity of the forming tube channel is variable, and a cross press drive is provided for displacing a cross press stamp of (Continued)

the plurality of cross press stamps into the open longitudinal side of the forming tube channel in a first transverse direction.

20 Claims, 17 Drawing Sheets

(56) References Cited

U.S. PATENT DOCUMENTS

| | | | | |
|---|---|---|---|---|
| 5,481,466 | A * | 1/1996 | Carey | A22C 17/0086 83/37 |
| 5,566,600 | A | 10/1996 | Johnson et al. | |
| 6,045,071 | A * | 4/2000 | Emsens | B26D 7/0641 241/101.4 |
| 7,603,936 | B2 * | 10/2009 | Pryor | B26D 7/0625 83/567 |
| 10,160,602 | B2 * | 12/2018 | Torrenga | B65G 23/44 |
| 10,245,745 | B2 | 4/2019 | Voelkl | |
| 10,307,927 | B2 | 6/2019 | Mayer et al. | |
| 10,710,259 | B2 * | 7/2020 | Völkl | B26D 7/32 |
| 10,843,364 | B2 * | 11/2020 | Völkl | B26D 7/0625 |
| 10,875,207 | B2 | 12/2020 | Voelkl | |
| 11,731,304 | B2 * | 8/2023 | Mayr | A22C 17/0033 83/19 |
| 12,350,854 | B2 * | 7/2025 | Kammer | B26D 7/0608 |
| 2019/0281843 | A1 * | 9/2019 | Völkl | B26D 5/00 |

FOREIGN PATENT DOCUMENTS

| | | |
|---|---|---|
| CN | 107379055 A | 11/2017 |
| DE | 10 2012 214 741 A1 | 2/2014 |
| DE | 10 2016 107 849 A1 | 11/2017 |
| WO | 2017/186828 A1 | 11/2017 |

OTHER PUBLICATIONS

German Search Report Dated Mar. 27, 2020, Application No. 10 2019 110 026.7, Applicant TVI Entwicklung Und Produktion GMBH, 7 Pages.

PCT International Search Report Dated Jul. 21, 2020 (with English Translation), Application No. PCT/EP2020/060684, 5 Pages.

PCT Written Opinion of the International Search Authority Dated Jul. 21, 2020, Application No. PCT/EP2020/060684, Applicant TVI Entwicklung Und Produktion GMBH, 8 Pages.

* cited by examiner

CUTTING MACHINE AND METHOD FOR SLICING A LOAF INTO SLICES

CROSS-REFERENCE TO RELATED APPLICATIONS

This application is the U.S. national phase of PCT Application No. PCT/EP2020/060684 filed on Apr. 16, 2020, which claims priority to German Patent Application No. DE 10 2019 110 026.7 filed on Apr. 16, 2019, the disclosures of which are incorporated in their entireties by reference herein.

TECHNICAL FIELD

Cutting machines for slicing pieces of elastic material are mainly used in the food industry.

BACKGROUND

The material to be sliced can be, in particular, meat or fish or any other food product.

A distinction must be made between on the one hand, elongated pieces with a cross section that is constant over the length, so-called calibers or strands, in which, for example, sausage or cheese is produced and on the other hand, elongated pieces in which the cross section changes over their length, so-called loaves, such as pieces of grown meat.

In order to produce slices of approximately the same volume and thus the same weight, a uniform caliber only has to be advanced by the same feed distance for the slicing of a slice of the same thickness, for which so-called slicers are known, which slice off the slices at a very high cycle frequency.

In the case of non-uniform loaves, this is achieved in the prior art by first pressing the loaf in a forming tube to a cross section which remains constant over the length so that it fills this forming tube cross section as completely as possible, so that the loaf in this pressed state has a cross section which is the same and known over the length, even in its end regions.

Then, by specifying the slice thickness and pushing it forward out of the forming tube and cutting off this overhang by one such slice thickness in each case, slices can be cut with approximately exact weight.

The problem is that although the loaves may have similar dimensions within a batch, these dimensions can vary greatly from batch to batch. The dimensions can differ even more depending on the place of origin of the piece of meat on the animal or even the type of animal.

For this reason, it is known that the forming tube has a cross section that can be varied in at least one transverse direction, so that loaves with different cross sections can be inserted and pressed.

For this purpose, a cross press stamp which can be inserted into a forming tube channel from its open longitudinal side can be used in addition to the longitudinal press stamp which can be inserted in the longitudinal direction into the then circumferentially closed forming tube.

It is also known to provide a forming tube turret with several forming tubes of different sizes and/or shapes of their cross sections, which can be used as required, and which, in the case of two identical forming tubes, also allows loading of one of the two identical forming tubes while slices are currently being cut from the other forming tube.

However, pressing not only in longitudinal direction but also in transverse direction of the loaf on a forming tube turret with several forming tubes is difficult to realize.

If, in addition, for variable use of the cutting machine, it is also to be possible to slice material with a rigid, non-elastic portion, in particular running in the longitudinal direction, such as a piece of meat with bone, e.g., a cutlet strand, on the one hand a transverse pressing is absolutely necessary for this, since such a cutlet strand cannot be pressed in the longitudinal direction, and on the other hand a toothed blade is additionally required—in contrast to a non-toothed blade in the case of boneless material—in order to cut the bone.

SUMMARY

It is therefore the object according to the invention to further develop a known slicing machine in such a way that it can be used very variably, also for slicing bony material as well as for other special cases, despite a simple and inexpensive construction, as well as a method for its operation.

This object is solved in a known cutting machine with a forming tube by the fact that the channel cavity has a variable width and several cross press stamps with different widths are provided which fit into the different adjustable widths of the forming tube channel.

These cross press stamps can be moved by means of a cross press drive in a first transverse direction, the cross press direction, into the open longitudinal side of the forming tube channel.

Compared to a forming tube with several forming tube openings, the space requirement and thus the size of the machine is reduced by the presence of only one forming tube channel, and cleaning is also facilitated, since the cross press stamp is moved completely out of the forming tube channel in the transverse direction anyway between the cutting of different loaves, and in this state cleaning of both the forming tube channel and the cross press stamp is also possible easily and quickly.

The forming tube channel preferably has two side walls running parallel to one another and variable in their free transverse spacing, the plane running parallel thereto in the middle between the channel side surfaces of these two side walls being designated as the longitudinal center plane of the forming tube channel and, when the cross press stamp of the forming tube is inserted, of the forming tube.

The bottom of the forming tube channel does not necessarily have to be perpendicular to the side surfaces when viewed in its longitudinal direction, but can also be inclined for this purpose.

To change the width of the channel cavity, only one of the side walls of the forming tube channel can also be displaced in its distance from the opposite side wall, preferably along the top of the bottom of the forming tube channel.

Preferably, both side walls of the forming tube channel are displaceable in opposite directions in the width direction, the 2nd transverse direction of the forming tube channel, in a controlled manner towards and away from the longitudinal center plane and/or the two side walls are always arranged in mirror image to the longitudinal center plane.

The latter has the advantage that the transverse press stamp to be inserted into the forming tube channel can always be inserted at the same transverse position in this second transverse direction and this transverse position does not have to be changed with a change in the width of the forming tube channel.

The pressing surface of the cross press stamp pointing into the channel opening is thus a component of the forming tube peripheral wall, which is thus made up of several parts and surrounds the variable free cross section of the forming tube.

Since the cross section of the forming tube changes depending on the set width of the forming tube channel and the position of the cross press stamp in the transverse press direction, the longitudinal press stamp used must be adaptable to this, i.e., its extension must either be variable in both transverse directions or—which is preferred according to the invention—there are several longitudinal press stamps, the widths of which correspond to the defined adjustable widths of the forming tube channel, and which are either variable in length i.e., in the cross press direction, or the individual longitudinal stamps likewise have different, fixed lengths in this dimension, in which case, however, the cross press stamp may only be stopped in defined cross press positions for cutting, i.e., it must be operated in a position-controlled manner.

If several longitudinal press stamps are present, it must be possible to couple and decouple them with the longitudinal press drive—which is present only once—in a simple manner.

The same applies to the several existing cross press stamps and the single existing cross press drive.

Preferably, the cross press stamps are arranged on or in a rotatable cross stamp turret and/or the longitudinal press stamps are arranged in or on a longitudinal stamp turret, wherein one or preferably both of them can be rotated in a controlled manner about a rotary axis, more precisely a shift axle, which is parallel to the axial direction and preferably spaced therefrom.

The circumferential position of each of these two turrets that is aligned with the forming tube is referred to as the cutting position.

There are several possibilities for bringing the required cross press stamp—corresponding to the set width of the forming tube channel—into this cutting position, which is needed on the one hand for coupling to the cross press drive and on the other hand for insertion into the open side of the forming tube channel:

The first possibility, according to the invention, is that the cross stamp turret is arranged offset in the axial direction outside the axial length range of the forming tube channel, preferably in the axial direction above the forming tube channel.

In this case, the cross press drive has at least one guide running in the longitudinal direction, along which the desired cross press stamp is brought into the functional position in the axial direction, in particular pushed or pulled, and which holds the cross press stamp in the transverse directions to the insertion direction, preferably positively on the cross press drive.

The cross stamp turret, on the other hand, has at least one such guide for each cross stamp fastened to it, so that after the cross stamp turret has been rotated into the position in which the desired cross stamp is to be inserted, the cross stamp turret can be moved to the desired position, in which the desired cross press stamp is aligned with the longitudinal guide of the cross press drive—the cutting position—this cross press stamp can be moved along the guide of the cross stamp turret and moved onto or into the guide of the cross press drive until it reaches the starting position, in which it is secured relative to the cross press drive, in particular with regard to its axial position, preferably by positive locking.

This securing is preferably carried out with the aid of the cross press drive, for example in that a locking pin can be retracted into or extended from a corresponding locking recess of the cross press stamp in a controlled manner from the cross press drive between a locked and an unlocked position. This locking pin can be accommodated inside a hollow push rod of the cross press drive.

The cross press stamp can also have more than one such locking recesses in the axial direction, so that the cross press stamp can be locked not only in the normal position but also in a position raised in the axial direction.

Since the forming tube channel can also have two different such positions, i.e., a normal position and a position raised in the axial direction, in the raised position a cube creel described later can be placed under the lower end of the forming tube when both the cross press stamp attached to the cross press drive and the forming tube channel are in the raised position.

This displacement of the cross press stamp, which is in the cutting position, from the guide on the cross stamp turret onto or into the guide of the cross press drive and back is preferably carried out by means of the push rod, which is part of the longitudinal press drive and thus in the longitudinal direction, the axial direction by means of a driver, which is attached to the push rod, preferably the same push rod, which otherwise holds a longitudinal press stamp and pushes it forward.

This driver can be coupled or decoupled with the transverse press ram located in the cutting position. In this way, the required cross press stamp can easily be brought into the starting position on or in the guide of the cross press drive in order to be coupled to it.

In this initial position, the cross press stamp is locked relative to the cross press drive, in particular with the aid of the cross press drive, preferably in that a locking pin can be moved in a controlled manner by means of the cross press drive between a locking or unlocking position relative to the cross press stamp on the cross press drive.

In the second possibility, the cross stamp turret can also be arranged in the axial direction in the length region of the forming tube channel.

In this case, the cross stamp turret is hollow in its interior at least to the extent that the forming tube channel can be placed therein. Preferably, the cross stamp turret comprises two axially spaced retaining rings which are rotatable about the shift axis and between which the cross press stamps are arranged in the axial direction by being releasably fastened by one of their end regions to one of the retaining rings in a defined circumferential position.

They are thus already in the correct position in the axial direction for coupling with the cross press drive, and the desired cross press stamp only has to be brought into the cutting position by rotating the cross press turret about the shift axis.

Subsequently, the cross press drive can contact and preferably lock the cross press stamp at its rear side by extending it in the cross press direction and can disengage it from the cross stamp turret and retract it into the channel cavity by further advancing it in the direction of the channel cavity.

When retracting, the cross press stamp can be held back on the retaining rings of the cross stamp turret, in particular in the retaining ring, when it reaches its stops, whereby the connection to the cross press drive is released automatically, if necessary after the existing locking mechanism has been released.

Magnetic stops and/or holders on the cross stamp turret and/or on the cross press drive can be used very simply for this purpose.

This 2nd possibility does not require a driver for the push rod of the longitudinal press stamp drive and shortens the time required for coupling a new transverse press stamp. The disadvantage is the poorer accessibility of the forming tube channel for loading with a new loaf to be cut open, for which, however, a gap could be provided at a point on the circumference of the cross stamp turret, through which—with corresponding rotary position of the cross stamp turret—the forming tube channel would be accessible in radial direction.

The longitudinal press drive and/or the cross press drive and/or the blade are preferably force-controlled in their movement, in particular the longitudinal press drive and/or the cross press drive is force-controlled hereof. The cross press drive can only be force-controlled if cross press stamps are used whose extension in the cross press direction is variable.

To achieve complete contact of the outer circumference of the loaf with the inner circumference of the forming tube in the case of an elastic loaf, at least either longitudinal pressing or transverse pressing must be force-controlled.

Due to the large differences in the length of the loaves, this is virtually indispensable for longitudinal pressing.

Since the longitudinal press stamp cannot be a one-piece, fixed component in any case, but must have an extension that is variable at least in steps, or preferably infinitely variable, at least in the direction of the cross press stamp, it is then more flexible to apply force to the cross press stamp as well.

The longitudinal press drive and/or cross press drive can be embodied as a working cylinder unit—pneumatically or hydraulically operated—or alternatively be realized by a threaded spindle and a spindle nut that can be screwed onto it, the threaded spindle preferably being designed as a ball rolling spindle. With the aid of the threaded spindle and spindle nut, one or more push rods are moved in the respective pressing direction, the push rod preferably being arranged and guided on at least one guide rod running parallel thereto, preferably between two guide rods running parallel thereto, in order to keep the lateral deviations as small as possible.

Particularly for the purpose of easy cleaning of the cutting machine, but also to protect the drives, the longitudinal press drive on the one hand and/or the cross press drive on the other hand, the latter preferably together with the blade drive, is arranged in each case in a substantially closed, preferably watertight, drive box, which only contains the beams of the cutting machine, drive box, which only have the necessary—preferably sealed—passage for the respective moving functional element, in the case of the press drives for example the corresponding push rod, at the front end of which the clutch for coupling the respective press stamp is located.

In the case of the cross press drive, there can also be two push rods running parallel to one another, which are moved synchronously with one another and engage at mutually spaced positions on the cross press stamp, which has a considerably larger pressing surface than the longitudinal press stamp, whereby tilting of the cross press stamp and canting can be prevented.

Due to the cross pressing, in particular in both transverse directions, loaves which are not elastic in the longitudinal direction, e.g., due to a bone content, can be pressed at least with regard to their elastic content in the transverse direction in such a way that at least the elastic content is applied to the inner wall of the forming tube opening.

The cutting machine further comprises a cutting device with a blade.

This can be a linearly movable blade, in particular an endless belt-shaped blade of a band saw or a finite plate-shaped blade, which is moved back and forth intermittently, in particular in the direction of its cutting edge.

It can preferably be a rotating blade, which in particular rotates about a blade axis running parallel to the axial direction and in particular has a circular circumference, which is formed as a blade, which can be a toothed or non-toothed blade.

If the blade is circular—i.e., the feed into the loaf is not provided by the blade shape, as in the case of a blade with a spiral, outer cutting edge, such as a sickle blade—the blade axis is moved relative to the forming tube in a preferably radial direction in order to cut off a slice.

The path of movement is selected so that the cutting edge of the blade can smear over the entire cross section of the forming tube opening, in the axial direction preferably directly in front of the cutting end of the forming tube.

For this purpose, the blade axis can be attached to a rocker and this can perform a pivoting movement which also has a radial component with respect to the longitudinal direction of the forming tube channel, or the blade axis is arranged on a slide which can be moved linearly in a direction which contains a radial component with respect to the longitudinal direction of the forming tube channel.

With the rotating blade, when cutting hard parts in the loaf such as a bone, the penetration speed of the blade on the hard part will inevitably decrease and with increasing force application the speed of the blade will preferably increase, whereby the force application should preferably be limited upwards.

Preferably, therefore, the movement of the blade axis is position-controlled to ensure that the cutting edge of the blade smears over the entire cross section of this forming tube and thus cuts through the loaf.

In order to be able to change the blade quickly, for example in order to be able to use a toothed blade for cutting a bony piece of meat, the cutting device has a quick-release fastener for the blade, which in particular makes it possible to change the blade without tools and/or in less than 30 seconds.

In particular, the quick-release fastener has a pushbutton in the center of the blade, i.e., on the blade axis, which must be actuated in order to pull the blade axially off the blade axis—after it has been moved completely out of the cross section of the forming tube into a change position by means of a preferably radial movement—and to fit a new blade on and, in particular, to lock it in place.

Since a different longitudinal press stamp is required for each width forming tube channel, the cutting machine comprises several longitudinal press stamps which are kept in a longitudinal stamp magazine, preferably a longitudinal stamp turret.

With the aid of this longitudinal stamp magazine, the required longitudinal press stamp can be brought into cutting position in the axial direction behind the loading end of the forming tube turret, for which the longitudinal press stamp is selected whose width fits into the set or still to be set width of the forming tube channel.

The rotary movement of the longitudinal stamp turret can be coupled, in particular mechanically coupled, with that of the transverse stamp turret in order to always have the correct longitudinal press stamp automatically available in the cutting position, which is then automatically coupled with the axially approaching longitudinal press drive and is axially retracted by the latter into the forming tube channel opening and is automatically released from the longitudinal stamp turret for this purpose.

Similarly, when the longitudinal press stamp is completely retracted from the forming tube, the longitudinal press stamp is automatically transferred back to the longitudinal stamp turret into a receiving opening there and fastened in the latter and, on the other hand, released from the longitudinal press drive.

Preferably, the cutting machine according to the invention also has a stop element—known per se—for the front end of the loaf pushed out of the forming tube, in particular in the form of a stop plate, and of course in the axial direction with respect to the blade plane on the side opposite the cutting end of the forming tube.

To determine the slice thickness, this stop element, in particular the stop plate, is adjusted as usual in its axial distance from the cutting plane of the blade.

According to the invention, the stop plate is coupled to the blade axis, in particular mechanically coupled, and the distance between the blade axis and the functional edge of the stop plate, which faces the blade axis, is in particular adjustable. The stop plate is thus movable like the blade axis, in particular synchronously movable together with it, but does not rotate with the blade about the blade axis.

Preferably, the stop plate is supported relative to the cutting device or the base frame of the cutting machine, and in particular is guided along guides along which the stop element is guided when the position of the blade axis is changed both when slices are being cut and when the blade axis is moved into a change position for the blade—which may well be a position of the path of movement when slices are being cut.

The stop element can also be decoupled from the blade axis and/or the blade, which can be done in particular automatically as soon as the blade or the blade axis reaches a predetermined position on its path of travel, for example as soon as the blade no longer overlaps with the cross section of the forming tube opening in the cutting position or the blade axis is moved in the direction of the change position or has reached this change position.

Furthermore, the stop element) can also be adjustable in its radial distance to the blade axis relative to the blade—apart from in the axial direction—in particular by the stop plate being displaced relative to the blade, in particular being arranged pivotably, while maintaining the parallelism of the blade plane to the stop plane.

In order to be able to cut cubes, for example for goulash or shashlik, a cube creel is known close to the cutting end of the forming tube with intersecting, straight creel blades with their blades usually lying in a radial plane of the forming tube interior, which can be inserted into a recess of the forming tube which is usually open towards the outer circumference.

When not required, the recess is then tightly closed to the outside by a placeholder which, when the placeholder is fully inserted, has a through opening corresponding to and aligned with the rest of the forming tube opening.

However, such a cube creel usually requires that an intermediate plate, the main plane of which lies transverse, in particular perpendicular, to the axial direction of the forming tube, can be inserted into the free forming tube cross section upstream of the cube creel and covers the forming tube opening at least in the cutting position in order to serve as a pressing stop for the loaf to be pressed longitudinally during longitudinal pressing.

Longitudinal pressing against the cube creel is usually not possible, since it usually cannot withstand the load.

According to the invention, such a cube creel is not inserted into a recess in the longitudinal area of the forming tube, but is attached to the blade end of the forming tube as an add-on part.

For this purpose, both the forming tube channel and the cross press stamp, which is in the functional position, can be adjusted in the axial direction by the thickness of the attachment part from the normal axial position away from the blade to a raised position and can be locked in both positions.

This displacement of the forming tube by the axial thickness of the attachment part, which comprises the cube creel, and if necessary also by the thickness of the intermediate plate which may be present upstream of it and which can be activated and deactivated in the transverse direction, can preferably be carried out by means of single pneumatic cylinders, which is sufficient for the adjustment between two end positions of a movement path.

When cutting, or better sawing, bony material by means of a toothed blade, bone powder is produced, which should be discharged as far as possible from the cutting gap, which is why sufficient free spaces are provided in the blade for this purpose, for example in the circumferential direction between the teeth or in the form of depressions in the main surfaces of the plate-shaped blade, in which the bone powder can collect.

Since their collection capacity is limited, the cutting machine preferably includes a cleaning device to remove the bone powder from the rotating blade during the cutting process, which can be done, for example, by means of compressed air nozzles, water nozzles or mechanically by means of a brush that cleans the blade.

BRIEF DESCRIPTION OF THE DRAWINGS

Embodiments according to the invention are described in more detail below by way of example. They show:

FIG. 5: sectional views along the sectional planes shown in FIG. 4b, looking in the longitudinal pressing direction, i.e.

DETAILED DESCRIPTION

Figure 4A:
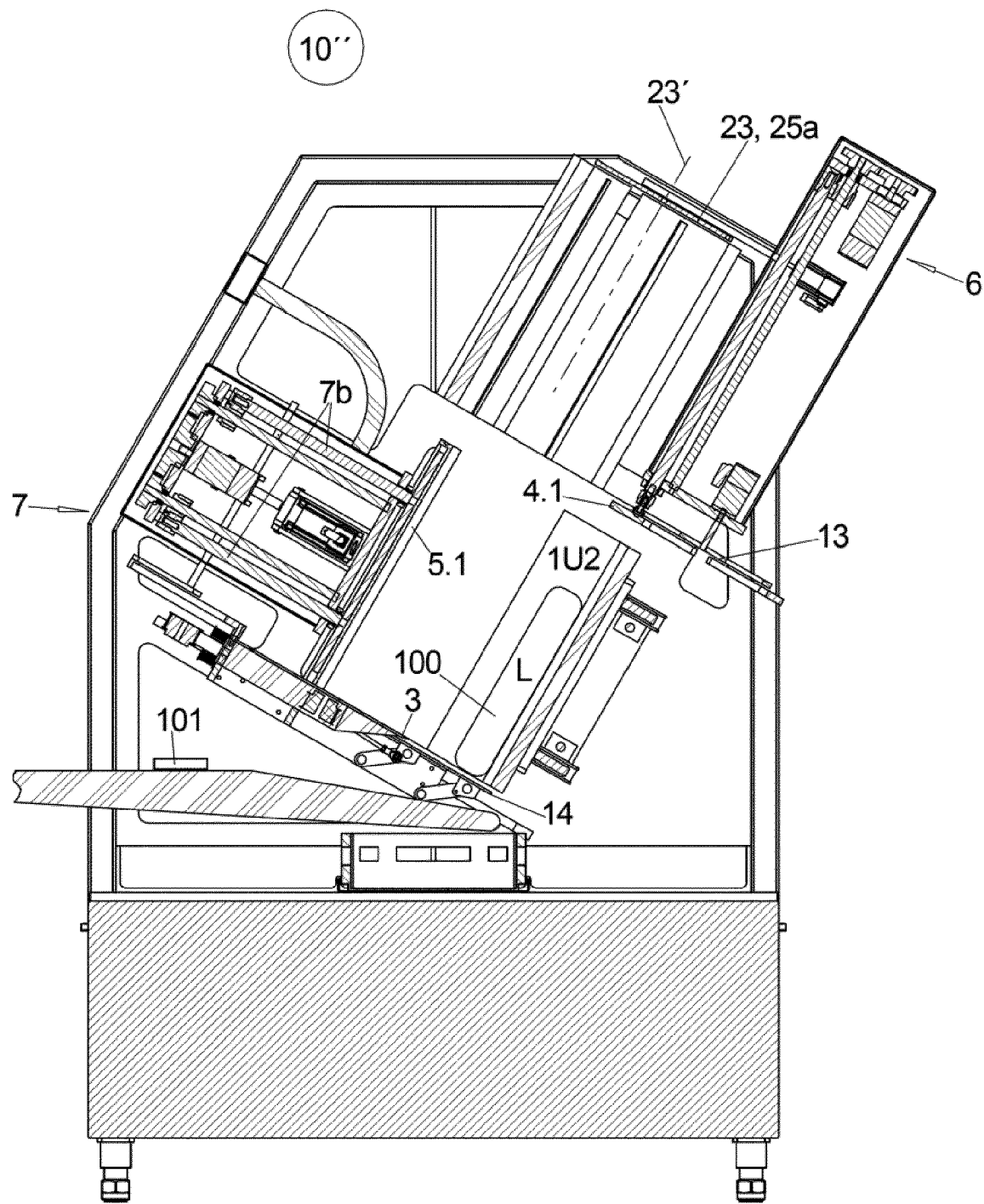
FIG. 4a: a section along the longitudinal center plane with the blades attached to the transverse press drives.
Figure 4B:
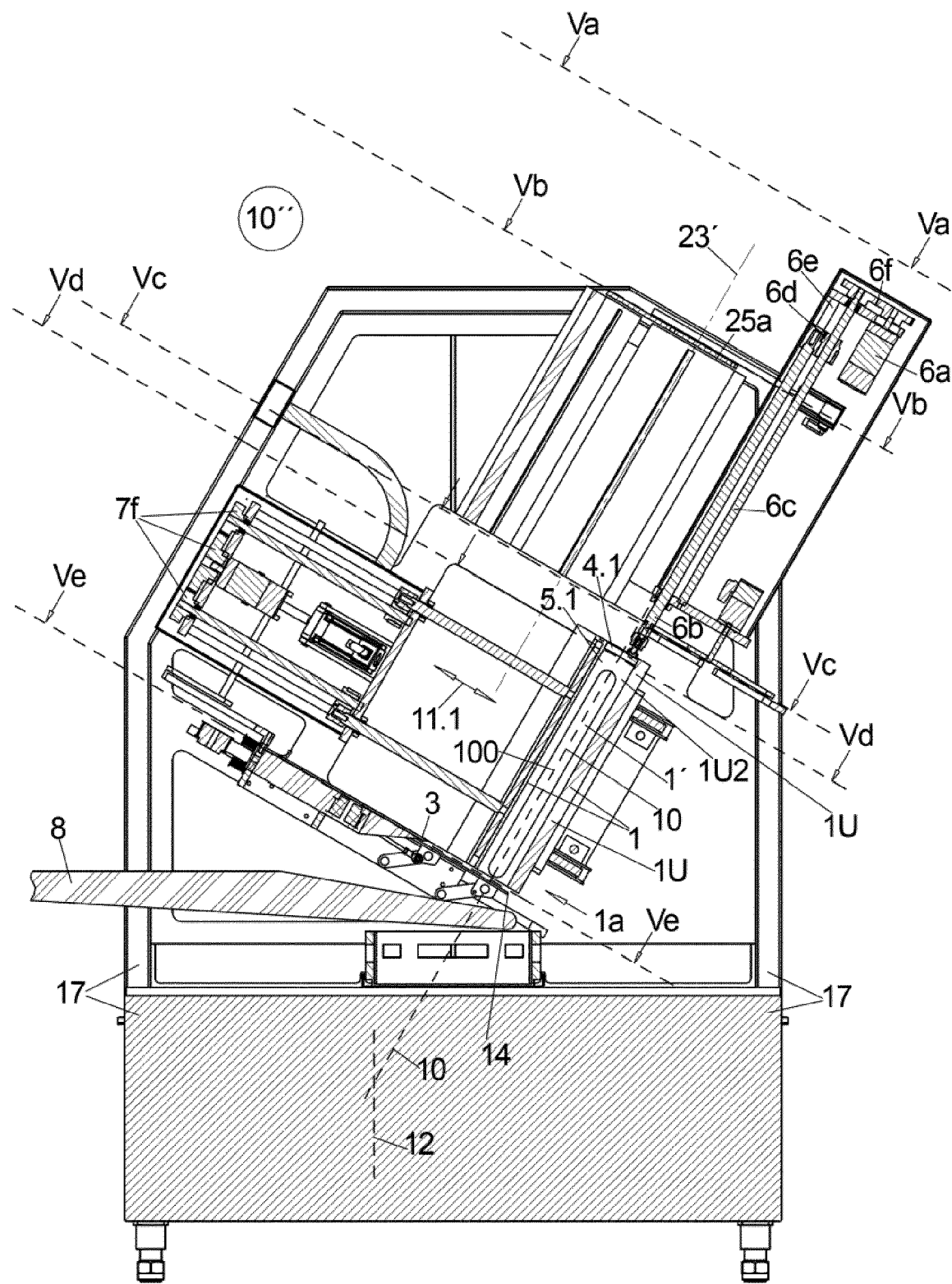
FIG. 4b: with both press stamps already in the forming tube channel.
Figure 5A:
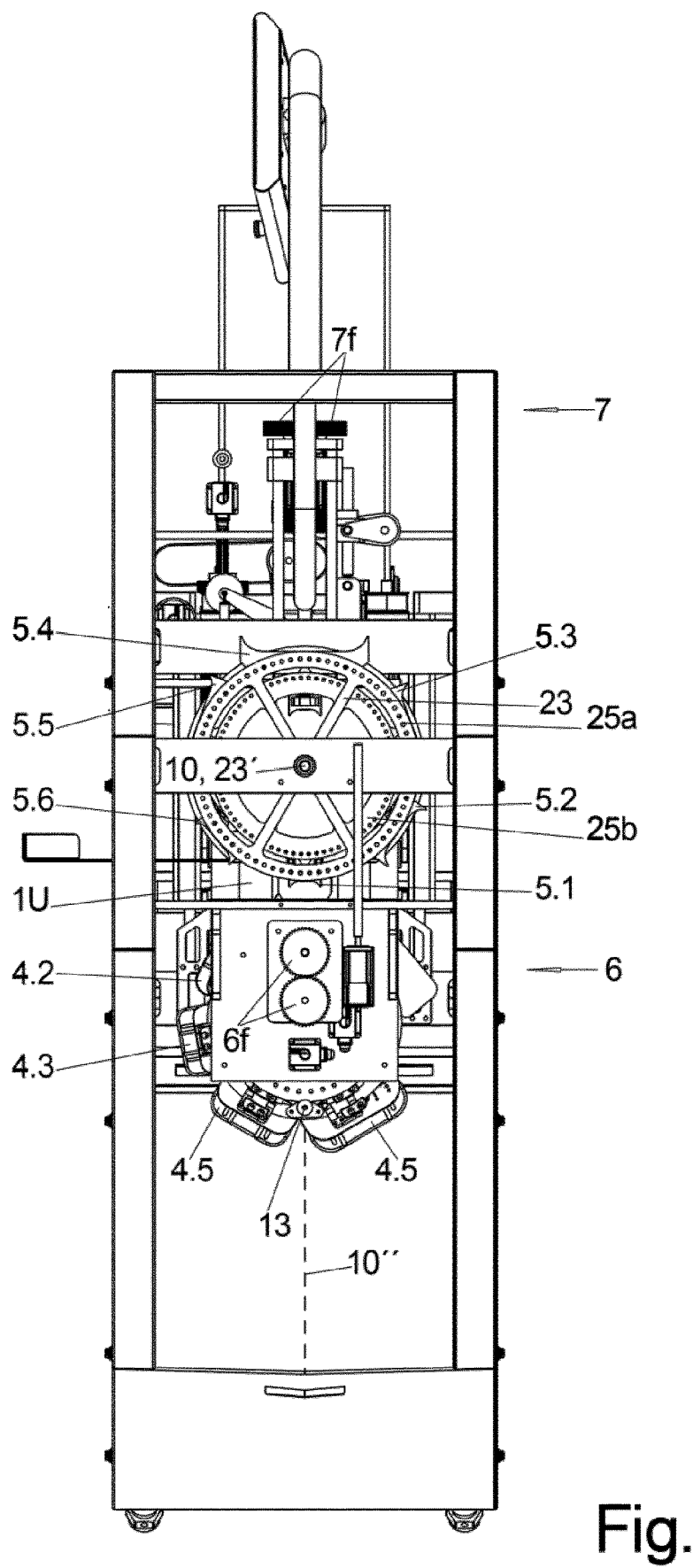
FIG. 5a: a top view of the machine in the direction of the longitudinal pressing direction, i.e., at the level of the cutting plane Va-Va.
Figure 5B:
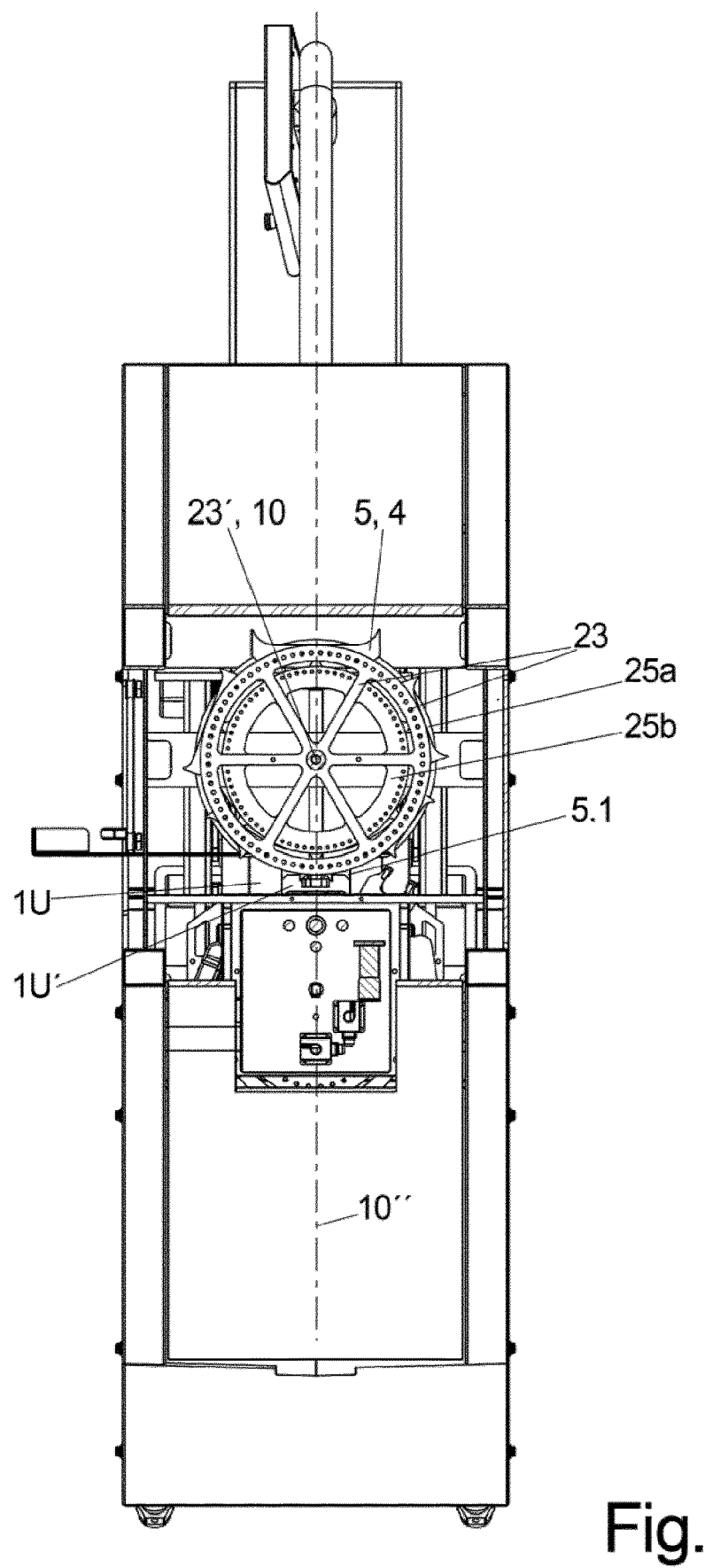
FIG. 5b: cut along the cutting plane Vb-Vb.
Figure 5C:
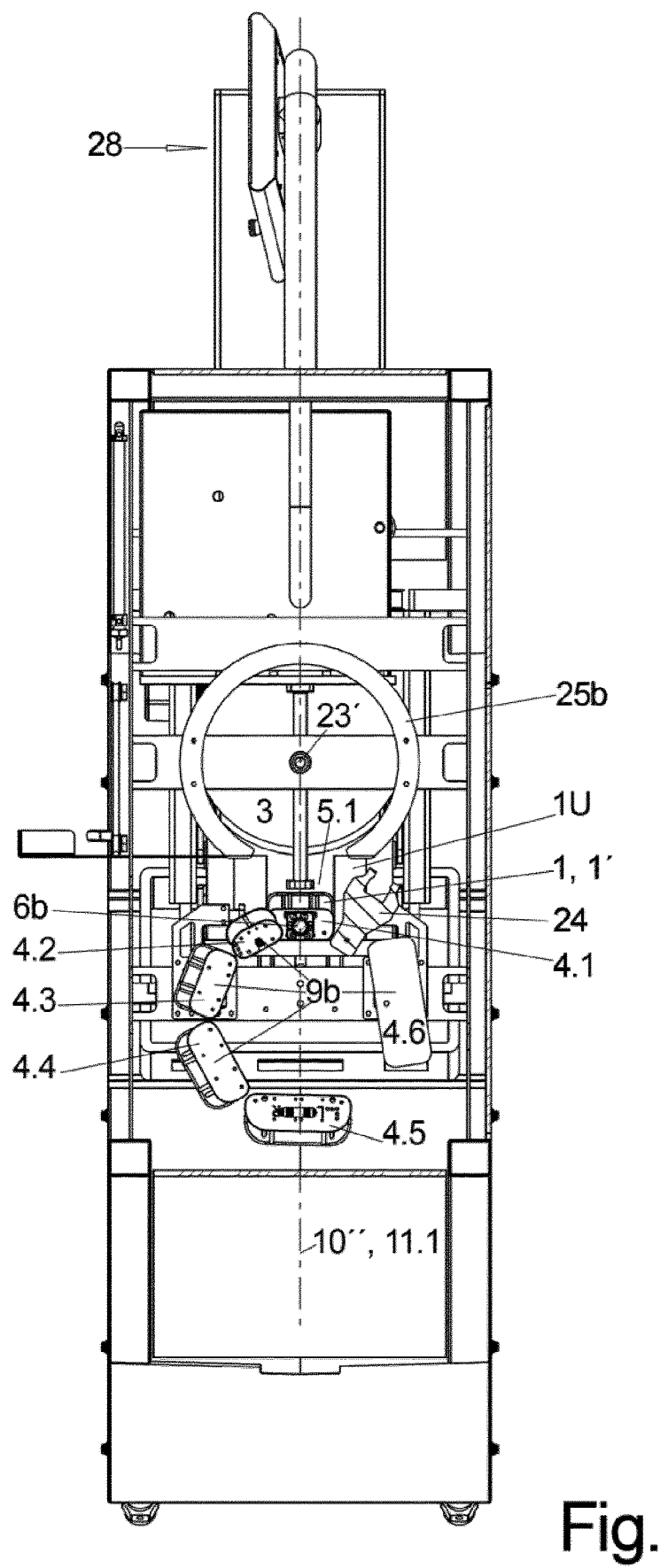
FIG. 5c: cut along the cutting plane Vc-Vc.
Figure 5D:
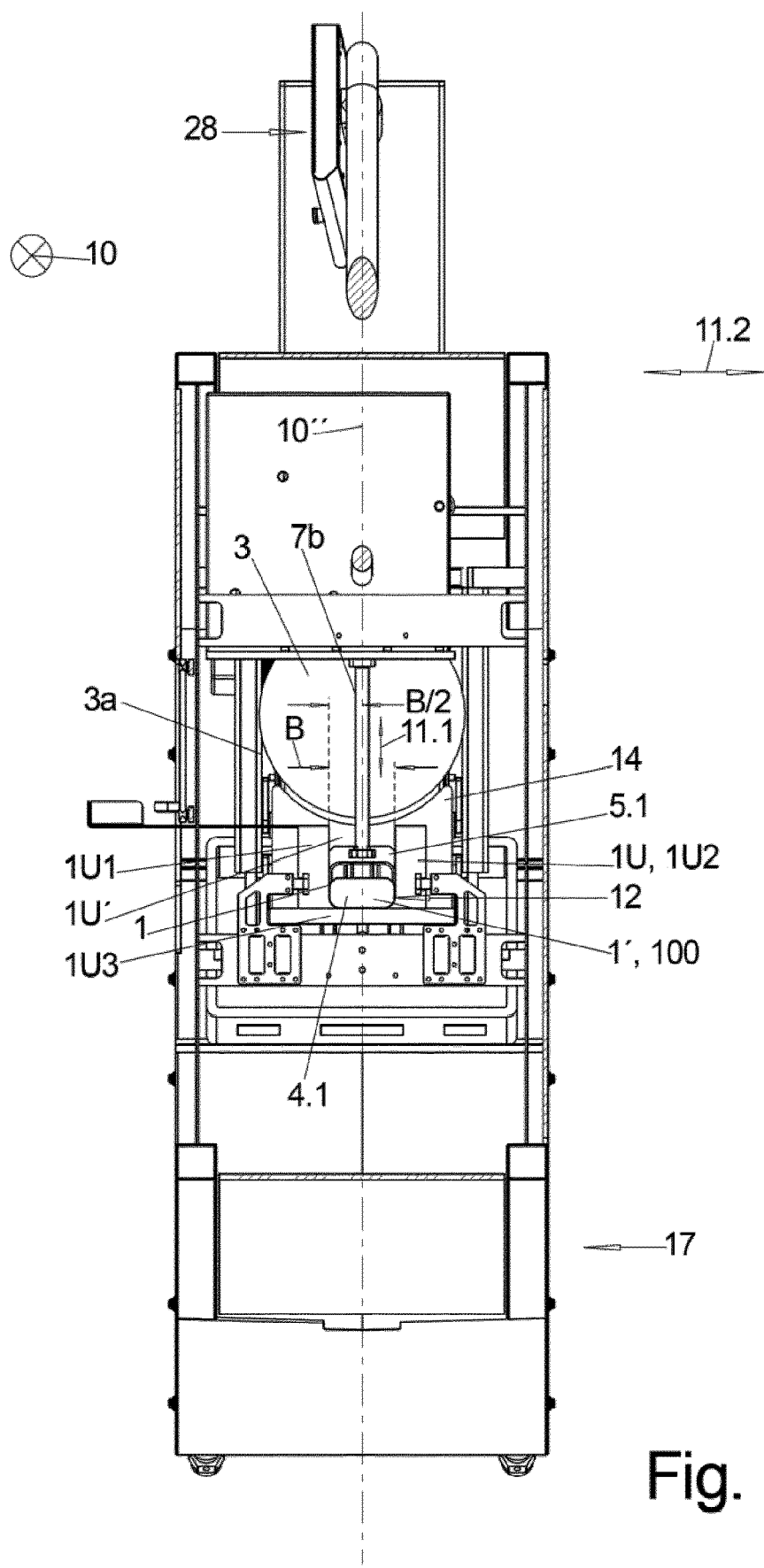
FIG. 5d: cut along the cutting plane Vd-Vd.

FIGS. 4b and 5d best show the forming tube 1 and the forming tube cavity 1' inside it, which is circumferentially closed while cutting slices and runs in the longitudinal direction 10. This is formed by a forming tube channel 1U of U-shaped cross section with a channel cavity 1U' and a cross press stamp 5.1 which is inserted from the open longitudinal side of the forming tube channel 1U with as little clearance as possible into the latter in a first transverse direction 11.1 or transverse pressing direction 11.1, which runs transversely, in particular at a 90° angle, to the longitudinal direction 10, so that it circumferentially closes, preferably tightly seals, the forming tube cavity 1U', thus forming the forming tube 1.

As the side view of the machine in FIG. 4b shows, the direction of the forming tube channel 1U, the axial direction 10 or longitudinal pressing direction 10, is not exactly perpendicular, but is inclined relative to the vertical 12 by in particular about 20 to 50 degrees in such a way that the open longitudinal side of the forming tube channel 1U points somewhat upwards, which facilitates the insertion of a new body 100 into the forming tube channel 1U.

As best shown in FIGS. 4a, b and 5d, the forming tube channel 1U consists of two side walls 1U1, 1U2, as well as a bottom 1U3, wherein the side walls 1U1, 1U2 are adjustable in their clear transverse distance, the width B, from each other by moving, in particular along the bottom 1U3, in the second transverse direction 11.2, which is located transversely, in particular in each case at a 90° angle, to both the axial direction 10 and the 1st transverse direction 11.1.

The side walls 1U1, 1U2 are always symmetrical to the longitudinal center plane 10'', which is defined by the first transverse direction 11.1 and the longitudinal direction 10 and which is located stationary parallel to the inner surfaces of the side walls 1U1, 1U2 and/or perpendicular to the surface of the bottom 1U3, and has the same distance B/2 from the inner surfaces of the two side walls 1U1, 1U2 on both sides.

The side walls 1U1, 1U2, or more precisely the inner surfaces of the side walls, preferably are located parallel to one another so that a cross press stamp 5.1 with a fixed width can be inserted between them with a precise fit.

Figure 1A:
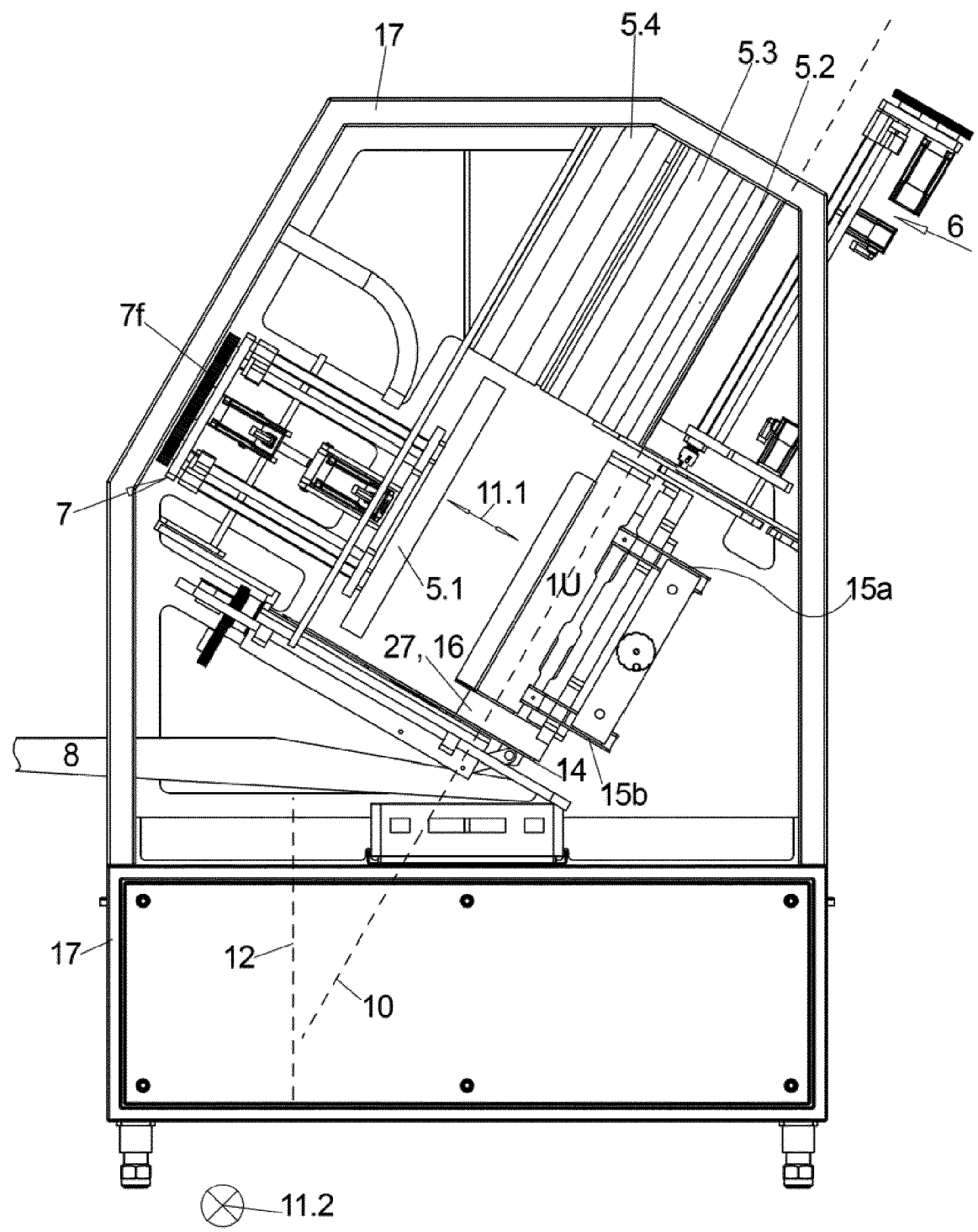
FIG. 1a: the cutting machine in the normal position in side view.
Figure 2:
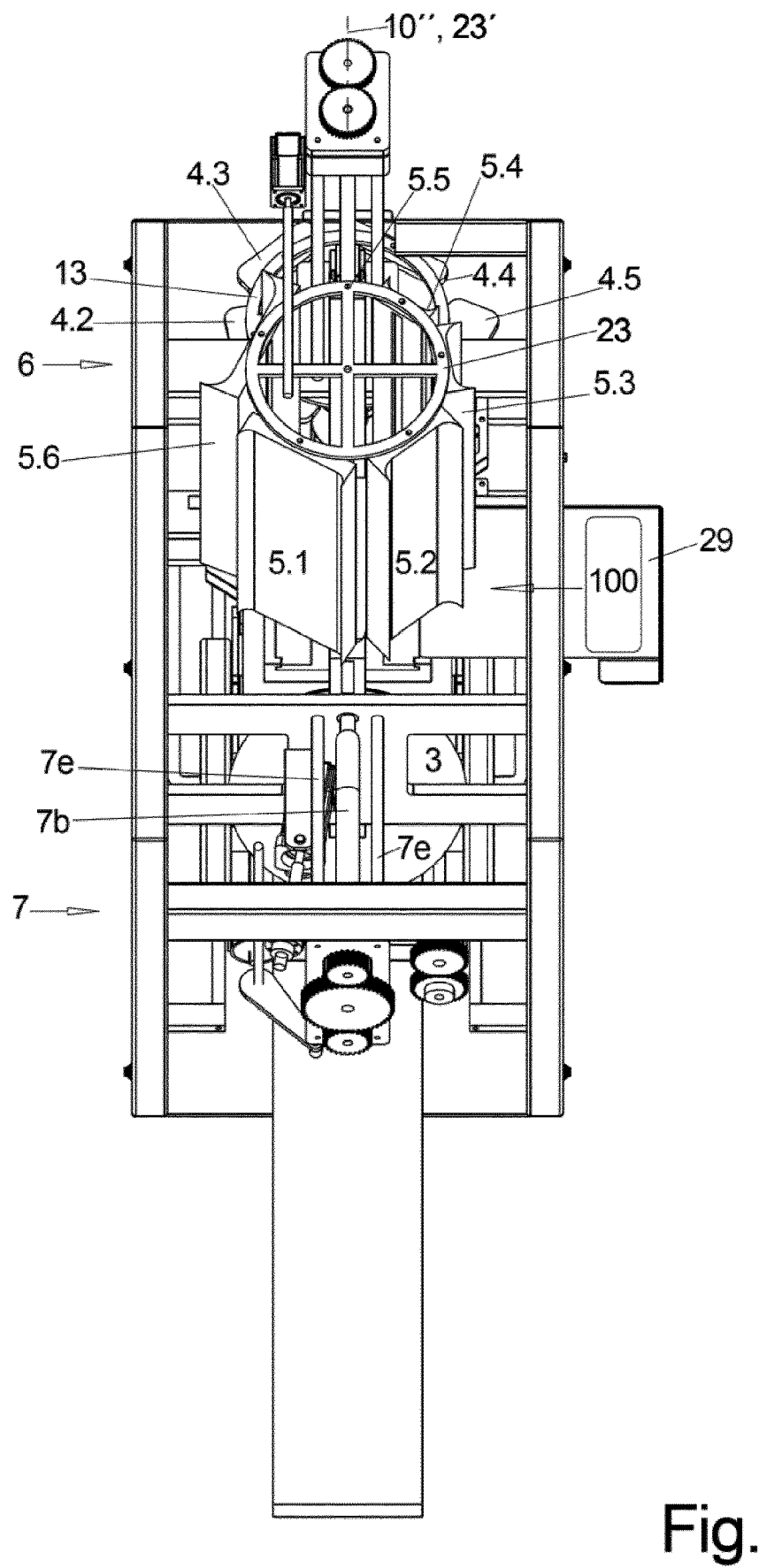
FIG. 2: the cutting machine in the normal position of FIG. 1a viewed vertically from above.

FIGS. 1a, b show—with the housing planking removed from the base frame 17—on the one hand in side view and on the other hand cut along the longitudinal center plane 10'' and in FIG. 2 in top view the cutting machine in a normal position in which the cross press drive 7 is in the retracted rest position and no cross press stamp is yet coupled thereto, and likewise the longitudinal press drive 6 is in the retracted rest position and no longitudinal press stamp is yet coupled thereto.

FIG. 1a shows the side wall guides 15a, b running in the second transverse direction 11.2 relative to the longitudinal direction 10, along which the two side walls 1U1 and 1U2 can be moved counter-synchronously to each other relative to the stationary longitudinal center plane 10''.

A loaf 100 of e.g., fresh meat located in this forming tube 1 and pressed in the first transverse direction 11.1 is additionally—as FIG. 4b shows—also pressed in longitudinal direction 10 by means of a longitudinal press stamp 4.1.

The longitudinal press stamp 4.1 first fills the cross section of the forming tube cavity 1' tightly in the rear end section and is then pushed further in the axial direction 10, so that the loaf 100—shown in FIGS. 4a, b—can first be pressed in the axial direction 10 against a longitudinal press stop—in this case the stop plate 14 applied to the cutting-side end face of the forming tube turret 1—and then—with the stop plate 14 objected to by this cutting-side end face of the forming tube turret 1—over the lower end, the front, lower end, the cutting end 1a, of the forming tube 1 and there a slice 101 can be separated from the front end of the loaf 100 by a blade 3 movable in transverse direction along the front end face of the forming tube 1, which slice then falls onto the discharge conveyor 8 and is transported away.

The side walls 1U1, 1U2 can be moved to certain, fixed transverse distances, from each other and thus from the longitudinal center plane 10'', and for each of these defined widths B, i.e., inner free widths, of the forming tube channel 1U there is a cross press stamp 5.1 to 5.6 with an analogous width b1 to b5, since the cross press stamps are not variable in width.

For this purpose, the cross press punches 5.1 to 5.6 are held in a cross press turret 23—as best shown in FIG. 2 and FIG. 5a—whose rotary axis or shift axis 23' runs parallel to the longitudinal direction 10 of the forming tube channel 1, but is offset relative to the forming tube channel 1 in such a way that—see FIG. 5a—the cross press stamp 5.1 is still radially and axially outside the forming tube channel 1U, namely in alignment with the guide 22 on the cross press drive 7.

This is because the cross stamp turret 23 is arranged offset upwards in the longitudinal direction 10 relative to the forming tube channel 1U, and the cross press stamps 5.1 to 5.6—when they are in a position aligned with the guide 22 on the cross press drive 7—can be pulled out downwards from the cross stamp turret 23 and pulled onto the guide 22 of the cross press drive 7 and locked there, as shown in FIGS. 3a to 3d.

In this way—before, after or simultaneously with the setting of the side walls 1U1 and 1U2 of the forming tube channel 1U to a defined transverse distance B—the appropriate cross press stamp 5.1 can be selected for this purpose by turning the cross stamp turret 23 accordingly until the matching cross press stamp 5.1 is in alignment with the guide 22 of the cross stamp drive 7 located below it in the cutting position 12 and is pushed onto the guide 22.

In this case, the shift axis 23' of the cross stamp turret 23 and the shift axis 13' of the longitudinal stamp turret 13 are located on opposite sides with respect to the longitudinal direction 10 running through the forming tube 1 and both in the longitudinal center plane 10''.

To avoid the need for another controlled drive, the longitudinal press drive 6 is also used to pull a desired cross press stamp 5.1 downwardly out of the cross stamp turret 23 and onto the guide 22 of the cross press drive 7, as shown in FIGS. 3a through g.

Figure 3A:
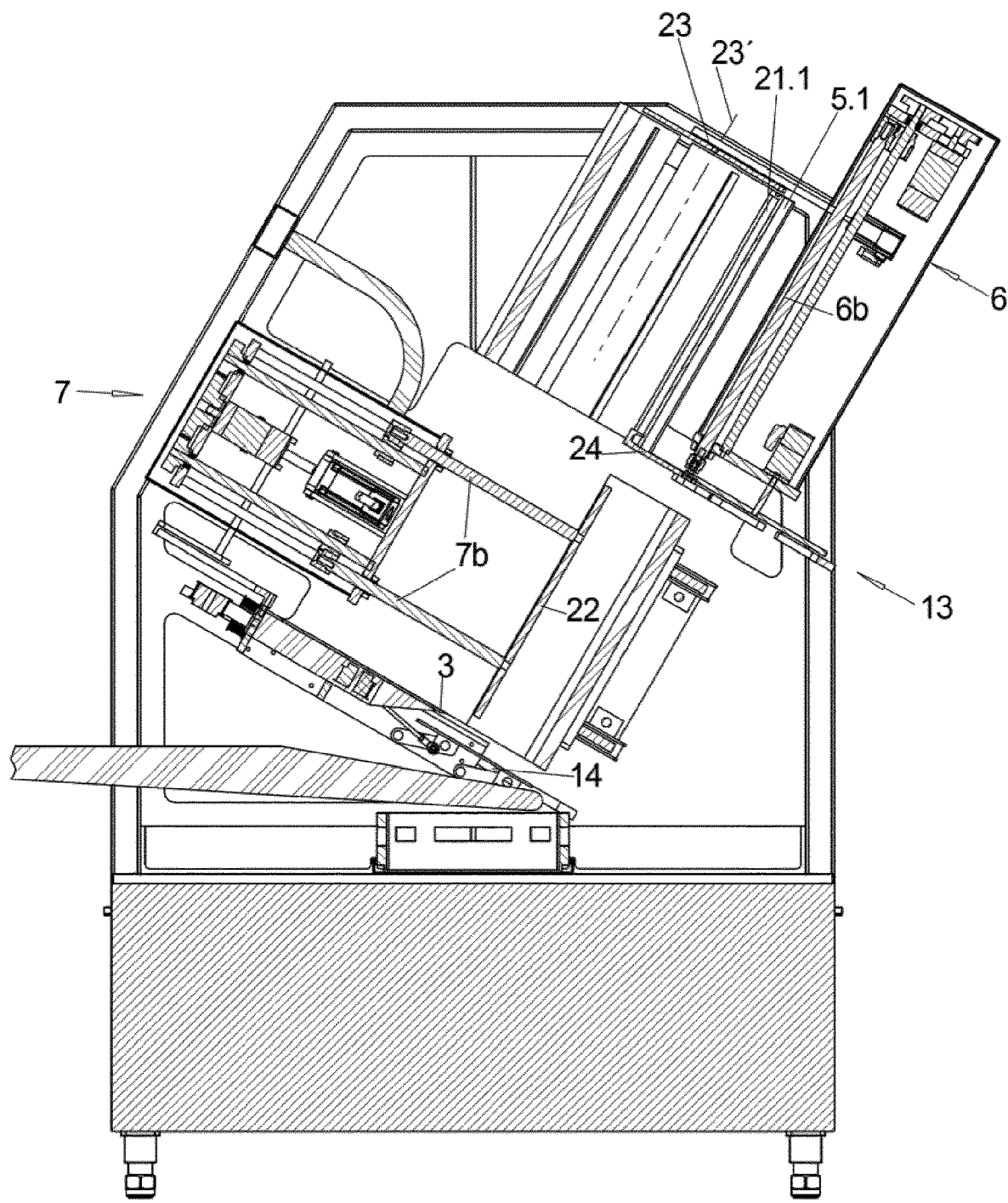
FIGS. 3a-g: different working positions for coupling a cross punch to the cross press drive.

As FIG. 3a shows, the push rod 6b of the longitudinal press drive 6—which normally pushes a longitudinal press stamp forward—can be coupled at its front end to a driver 24 which, like the longitudinal press stamps 4.1 to 4.6, is detachably fastened to a point on the periphery of the longitudinal stamp turret 13 and carries on its side facing the push rod 6b a matching other coupling part 9b. The driver 24 can be coupled to the lower end of the cross press stamp 5.1, which is located at the cutting position 12, when the driver 24 is located at the cutting position 12 by rotating the longitudinal stamp turret 13.

Before or after the driver 24 is pivoted into its cutting position 12 with respect to the shift axle 13' of the longitudinal press turret 13, the cross press stamp intended for use, e.g., 5.1, must also be brought into its cutting position 12 with respect to its cross press turret 23.

As a result, the lower end of this cross press stamp, e.g., 5.1, which is in the cutting position 12, comes into engagement with the driver 24 by means of an engagement element present thereon, which in this case, as seen in the side view of FIG. 3, is a hook whose opening faces the bottom of the forming tube channel 1U.

Figure 3B:
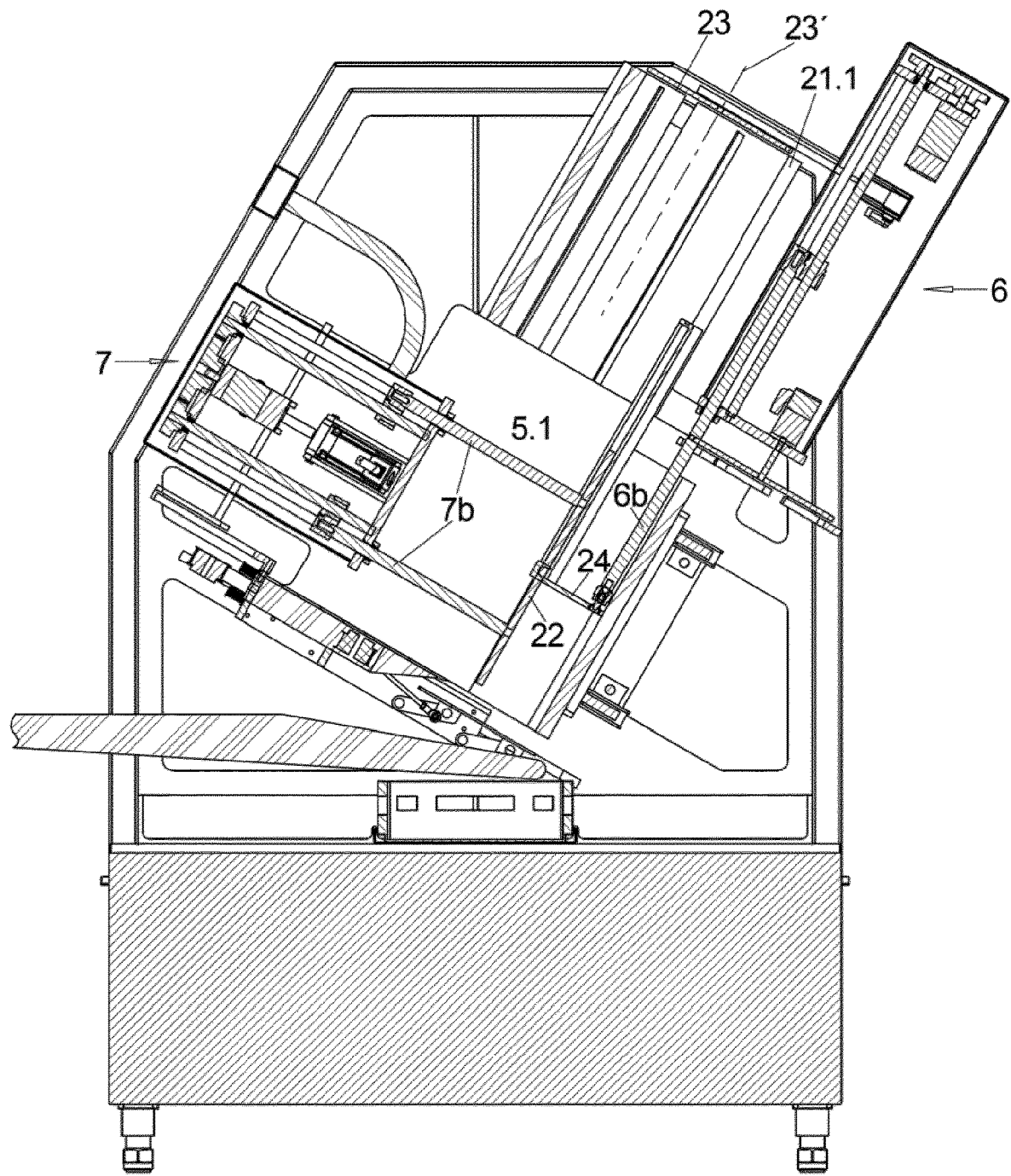
Figure 3C:
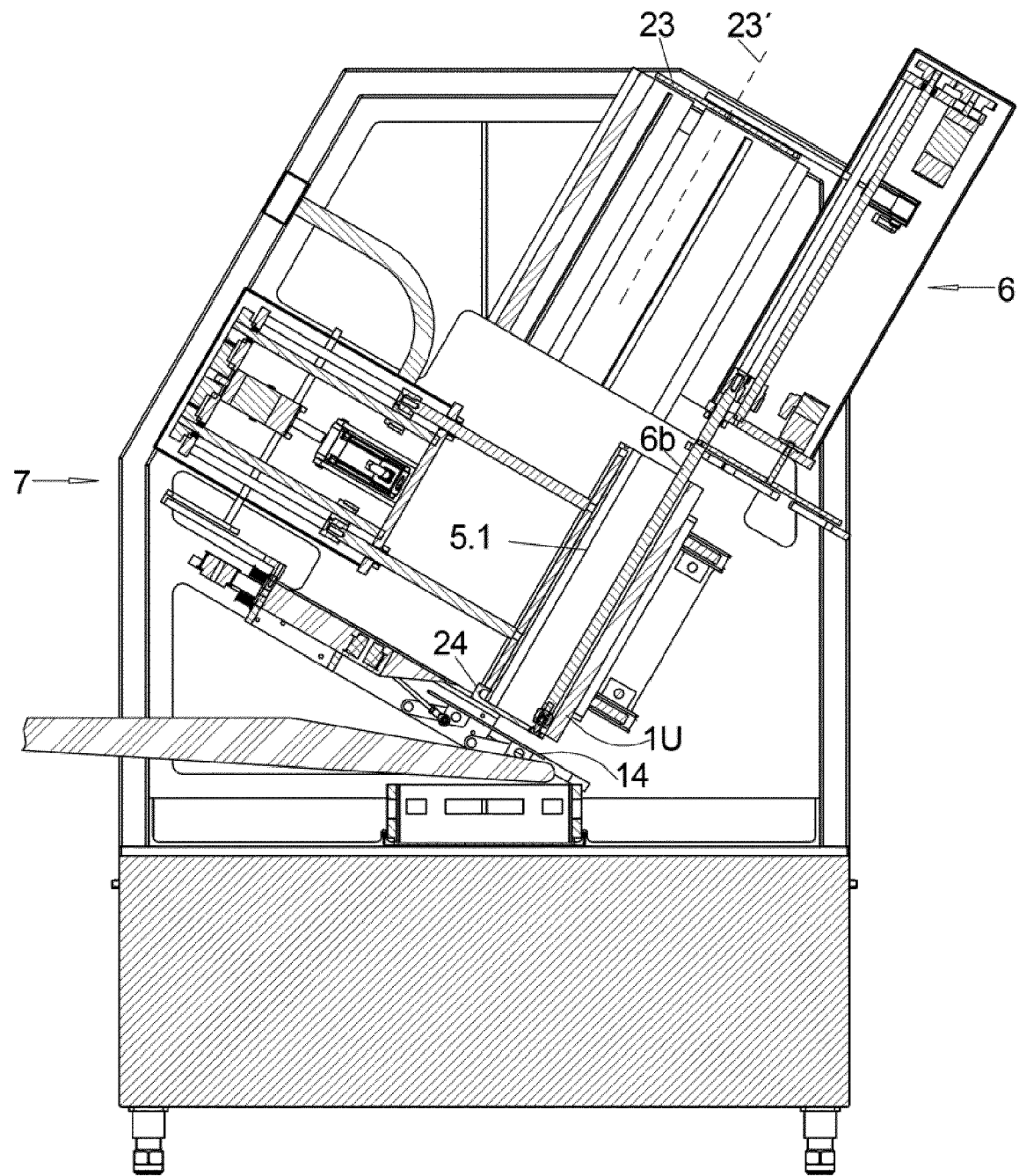

By axial downward movement of the push rod 6b, the driver 24 is moved downward and pulls the lower end of the cross press stamp 5.1 downward and onto the guide 22 of the cross press drive 7—as shown in FIG. 3b—until the cross press stamp 5.1 is in a defined working position in longitudinal direction 10 relative to the guide 22 according to FIG. 3c and can be locked relative thereto by means of a locking device—not shown. In this working position, the longitudinal extension of the cross press stamp 5.1 approximately coincides with the longitudinal extension of the forming tube channel 1U.

Figure 3D:
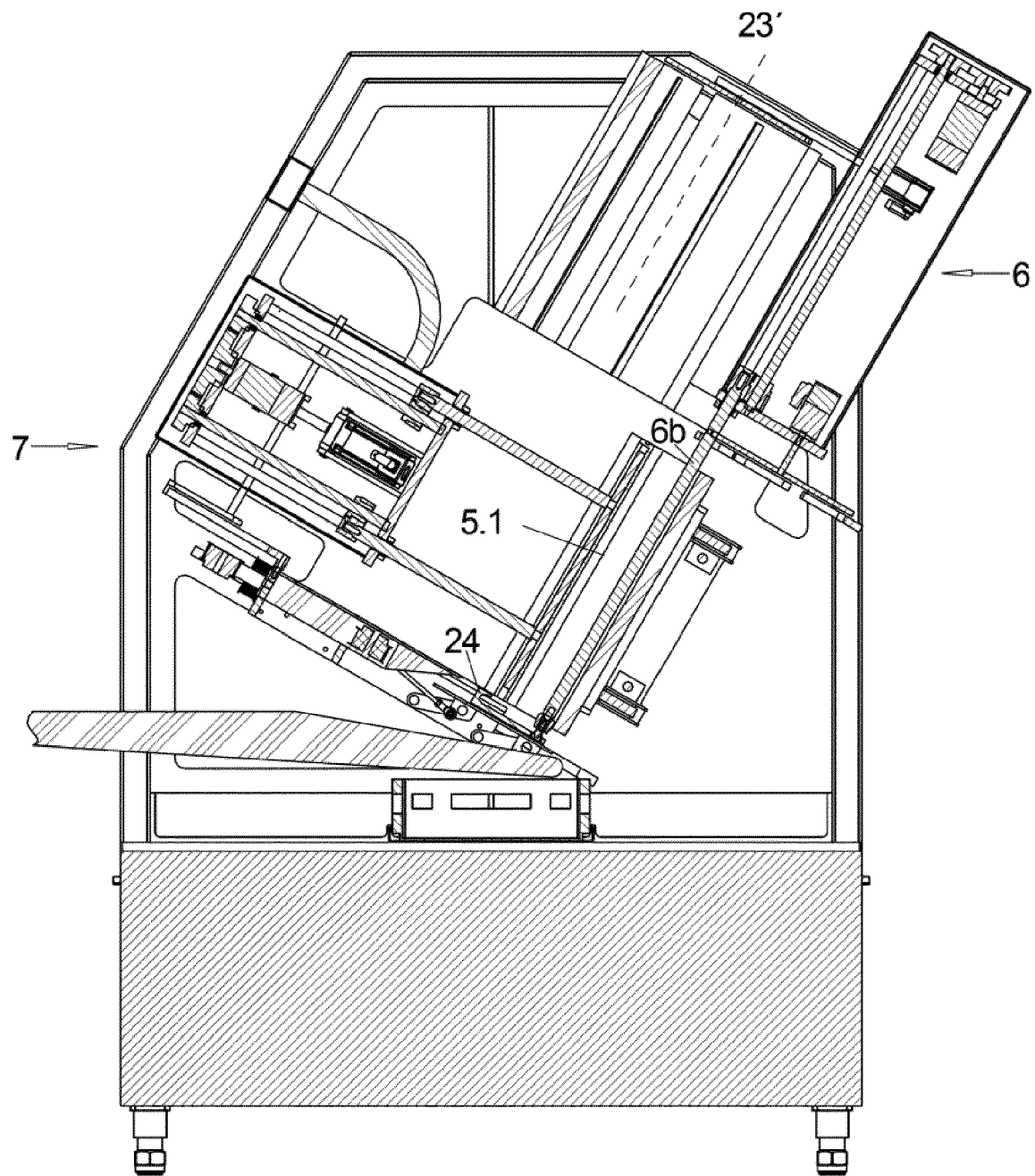

As soon as this has been done, the driver 24 is disengaged from the cross press stamp 5.1—as can be seen in FIG. 3d—which, in this form of driver 24, is done in that
first the cross press stamp 5.1 is moved by means of the cross press drive 7 in the direction of the forming tube channel 1U to such an extent that the engagement element of the cross press stamp is disengaged from the hook of the driver 24 in the first transverse direction 11.1, and
then the driver 24 is pushed forward in the axial direction 10 by means of the longitudinal press drive 6 until the driver 24 is completely below the lower end face of the cross press stamp 5.1 and the engagement element as shown in FIG. 3d.

Figure 3E:
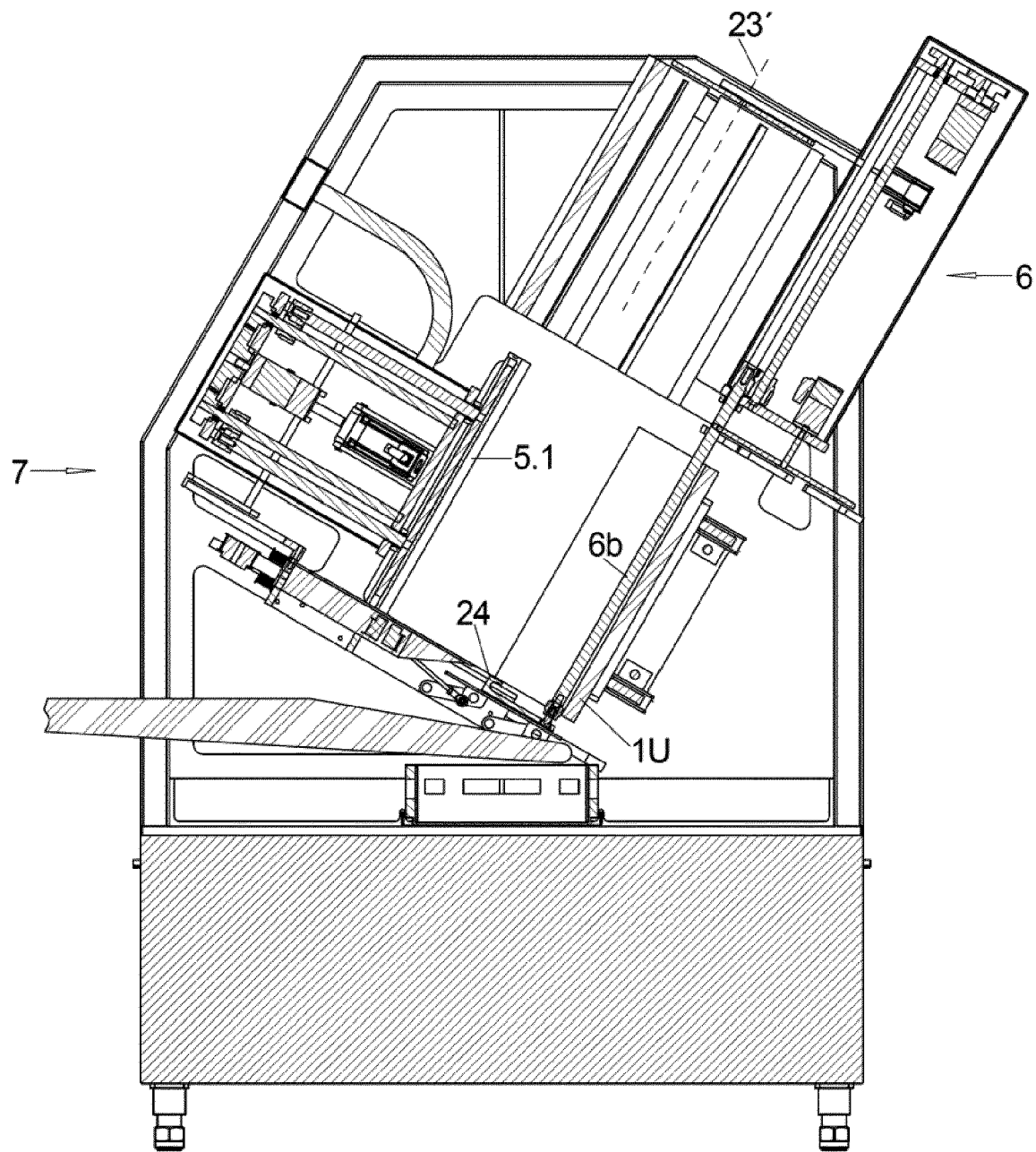
Figure 3F:
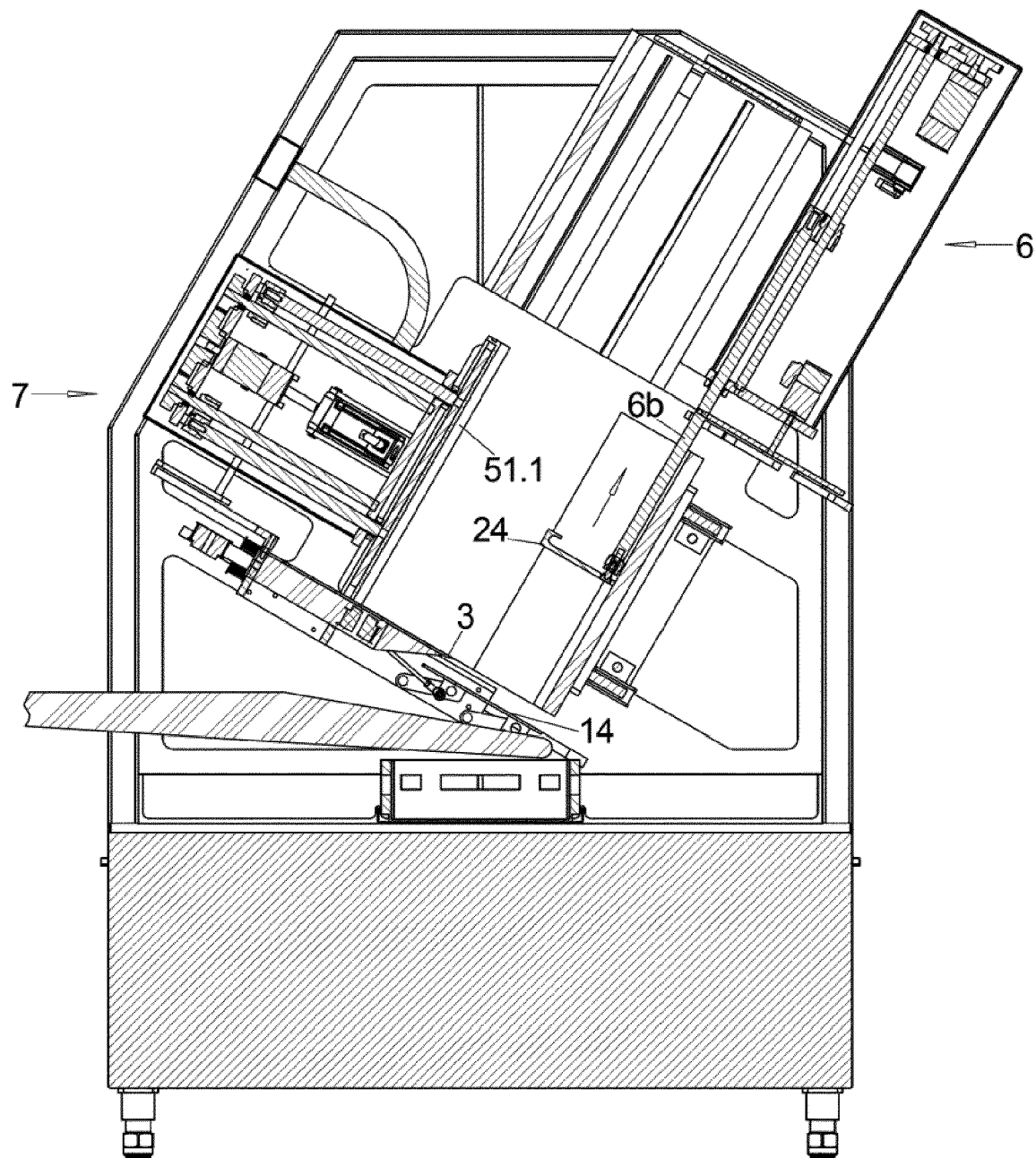
Figure 3G:
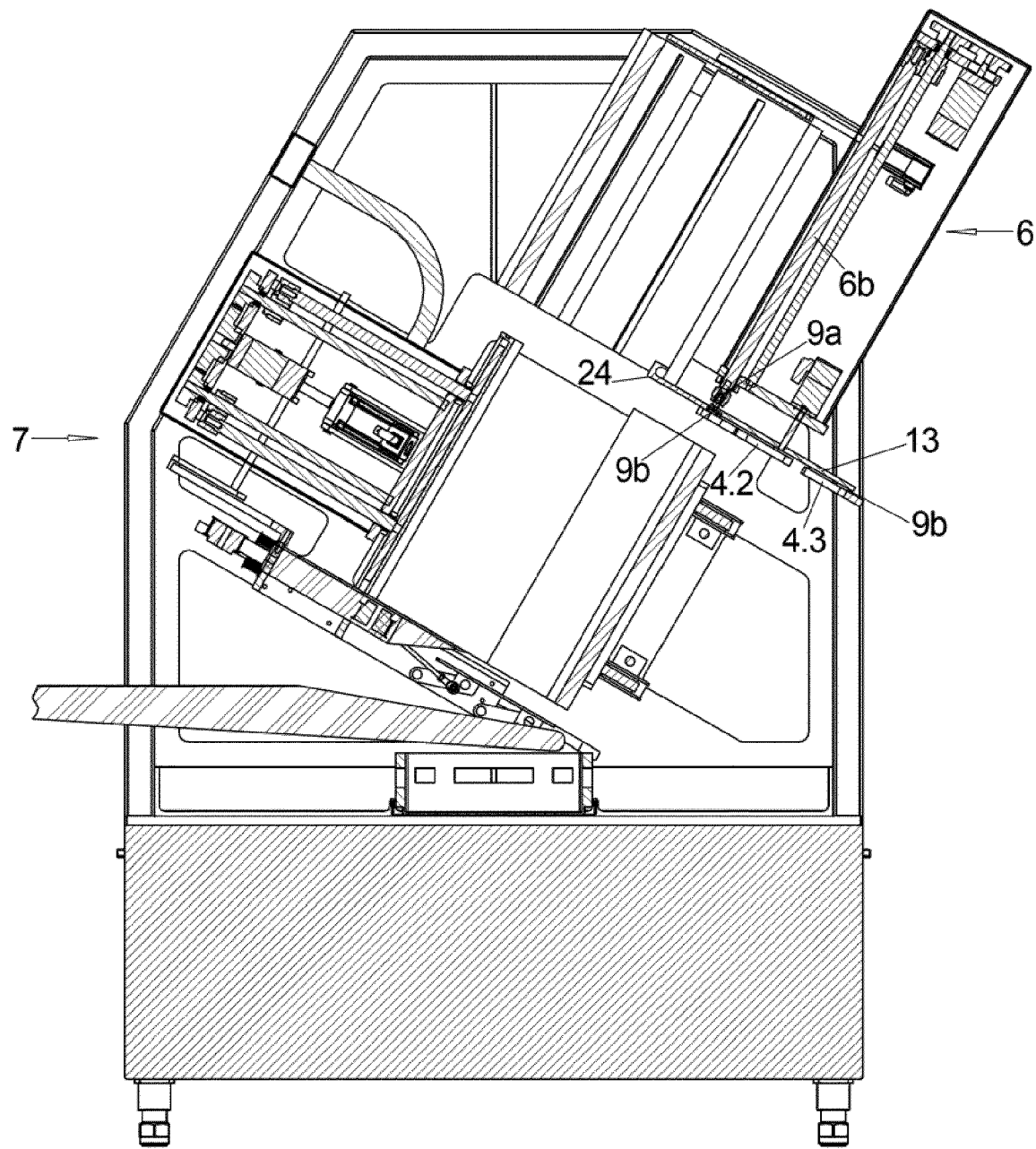

The cross press stamp 5.1 is then moved in the first transverse direction 11.1 from the forming tube channel 1U to such an extent that it is no longer in the axial path of movement of the driver 24 according to FIG. 3e, so that the driver 24 can now be moved back upwards in the longitudinal direction 10 by means of the longitudinal stamp turret 6 according to FIG. 3f, until the driver 24 again engages on the longitudinal stamp turret 13 according to FIG. 3g and, by moving the push rod 6b back further, the latter disengages from the driver 24 by releasing the clutch 9 between them.

The cross sections of FIGS. 5a to 5e reveal further details:

FIGS. 5a, b show the cross stamp turret 23 with the two retaining rings 25a, b between which, in the longitudinal direction 10, run the guides 21.1-21.6 for each of the cross press stamps 5.1-5.6 which are detachably attached to this cross press turret 23. The lower retaining ring 25b has a smaller diameter so that the cross press stamp required for pressing can be moved down along its outer circumference onto the guide 22 of the cross press drive 7 as described above.

In both figures, the cross press stamp 5.1, which has already been inserted into the forming tube channel 1U, can also be seen resting with its outer side surfaces against the inner surfaces of the side walls 1U1 and 1U2 of the forming tube channel 1U.

FIG. 5a also clearly shows the two gearboxes 6f, 7f which drive the two press drives 6, 7, each from a motor 6a, 7a, each with at least one threaded spindle 6c, 7c, whereby these gearboxes can also each comprise a toothed belt or a chain.

In FIG. 5c, the longitudinal stamp turret 13 and its shift axle 13' are only indicated, since this section lies directly below this generally ring-shaped longitudinal stamp turret 13. However, the longitudinal press stamps 4.1-4.6 arranged in a circle can be seen, whose upwardly pointing coupling parts 9b for coupling to the coupling part 9a of the push rod 6b of the longitudinal press drive 6 lie on a common concentric circle around the shift axle 13'.

In this figure, it can also be seen that the driver 24 is arranged in the same manner as a longitudinal press stamp at a circumferential point of the longitudinal stamp turret 13 and in the same detachable manner and can be coupled to the push rod 6b as the individual longitudinal press stamps 4.1-4.6 and also carries such a coupling part 9b.

In the case of the individual longitudinal press stamps, their variability can be seen in the radial direction of the longitudinal stamp turret 13, i.e., in the case of the longitudinal press stamp 4.1 already used in the forming tube channel 1U, its variability in length in the transverse press direction 11.1.

FIG. 5d shows only the longitudinal press stamp 4.1 in use, since this section lies above this longitudinal press stamp 4.1 already inserted in the forming tube 1, but already below the longitudinal stamp turret 13, on which the other longitudinal press stamps 4.1-4.6 are located.

Therefore, in addition to the forming tube 1, the circular disk-shaped blade 3 can be seen even better than in FIG. 5c, as well as the stop plate 14 arranged next to it, the functional edge of which is convexly curved and runs parallel to the outer circumference of the circumferential edge, the cutting edge 3a of the blade 3, usually at a small radial and usually also axial distance from it.

FIG. 5d further shows the actuating devices for the two side walls 1U1 and 1U2 in order to displace them along the bottom 1U3 and thus to adjust the width B of the forming tube channel 1U to a predetermined value corresponding to the width of one of the cross press stamps 5.1-5.6.

Figure 1B:
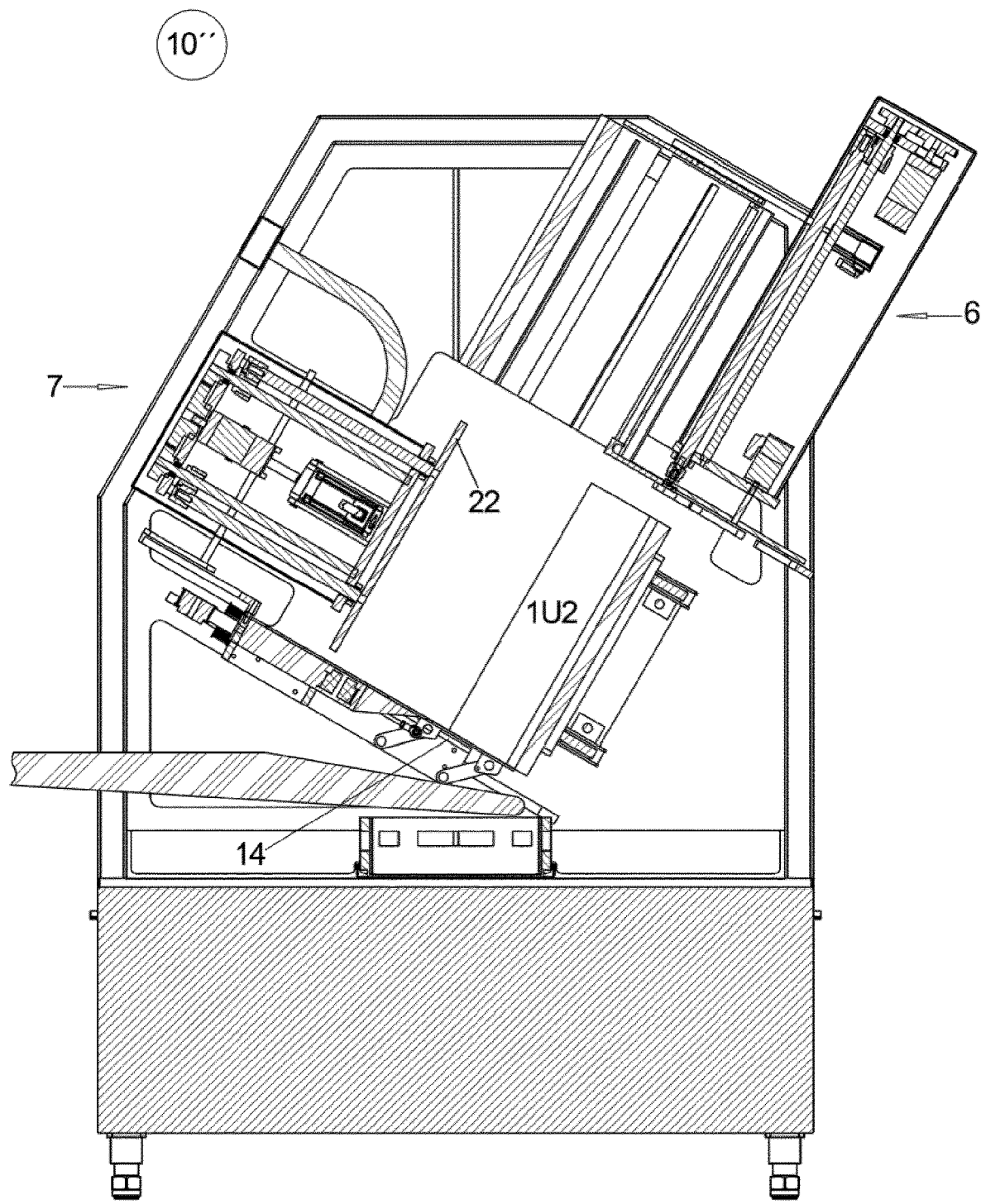
FIG. 1b: a section through the cutting machine in the normal position of FIG. 1a along the longitudinal center plane.

In this FIG. 5d it can also be seen that the bottom 1U3 together with the side walls 1U2 and 1U1 can be moved in the viewing direction of FIG. 5d, i.e., in the longitudinal direction 10, from the normal position to a raised position—as can the inserted cross press stamp 5.1—in order to be able to apply to the lower end of the forming tube 1 in this raised position—which can be seen in the side view in FIG. 1a compared with FIG. 1b—according to FIG. 1a an attachment part 27 with a cube creel 16 therein, which as is known has crossing blades, so that the cross section of the loaf to be cut open is cut open into individual strips lying next to one another before being cut off by the blade 3 and thus instead of one slice in each case a plurality of cubes are produced in each case.

Figure 5E:
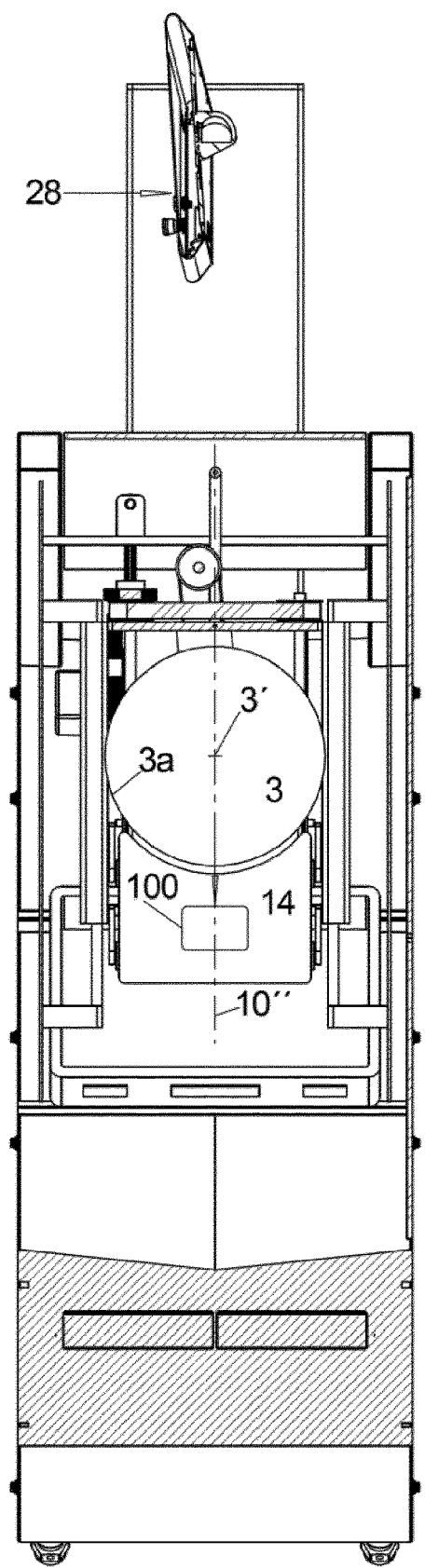
FIG. 5e: cut along the cutting plane Ve-Ve.

In the section of FIG. 5e, which is at a further lower level and lies directly at the lower end of the forming tube 1 on the cutting side, the blade 3 arranged directly below and the stop plate 14, which is at the same level or slightly lower, are fully visible, immediately before the cutting unit consisting of blade 3 and stop plate 14, which moves further downward in the representation of FIG. 5e, cuts off a slice 101 from the front loaf 100 projecting from the lower end of the forming tube 1 as far as the stop plate 14, as one of them is shown on the discharge conveyor 8 in FIG. 4a.

Thus, the procedure for pressing and slicing a loaf 100 into slices 101 is as follows:

Starting from the normal position of the machine, as explained with reference to FIGS. 1a, b as well as FIG. 2, the machine operator enters into the operating unit 28 the desired cross press stamp 5.1 and longitudinal press stamp 4.1 for the pressing, which can be done a new for each loaf 100 to be sliced or, in the case of a batch of loaves 100 of approximately the same size and shape, can also be done only once, before the start of slicing of this batch.

As a rule, at this point at the latest, the loaf 100 to be sliced is placed by the machine operator on the support surface 29 best seen in FIG. 2, which preferably projects laterally from the machine and has the same inclination as the forming tube channel.

Now the selected cross press stamp 5.1 is brought into the cutting position 12 and by means of the driver 24, which is actuated by the longitudinal press drive, is drawn into the division of labor onto the guide 22 of the cross press drive 7, as explained above for FIGS. 3a to 3g.

After the push rod 6b of the longitudinal press drive 6 is again uncoupled from the driver 24, it couples to the selected longitudinal press stamp 4.1, which in the meantime has been brought into the cutting position 12, as shown in FIG. 4a.

By means of their respective drives, the cross press stamp 5.1 and the longitudinal press stamp 4.1 are now displaced into the channel cavity 1U', preferably before the distance of the side walls 1U1, 1U2 are pushed together to the distance B provided for this loaf 100, in the sequence that first the longitudinal press stamp 4.1 is located within the axial length range of the cross press stamp 5.1 before the latter reaches the longitudinal press stamp 4.1 located in the channel cavity 1U', in particular before the latter dips into the forming tube channel 1U, so that the longitudinal press stamp 4.1, which is generally in 2 parts for this purpose, can then be compressed in the cross press direction 11.1 by the cross press stamp 5.1 during cross pressing.

However, the loaf 100 to be cut must be inserted into the forming tube channel 1U before the cross press stamp 5.1 dips into the forming tube channel.

This is done by pushing the new loaf 100 into the machine along a support surface 29 until the loaf 100 falls into the forming tube channel 1U, for which purpose the support surface 29 may also have an inclination in the direction of the forming tube channel 1U so that this can be done by gravity without pushing by the machine operator. The support surface 29 can project laterally from the machine as seen in plan view, as shown in FIG. 2, and/or also be embodied as a drawer which is open at the inner end, so that after the loaf 100 has been placed, this drawer only has to be pushed into the machine in order to drop the loaf 100 into the forming tube channel 1U.

Then the loaf 100 in the forming tube 1 can be pressed by the two punches simultaneously, alternately or also with intermediate reliefs both in the cross press direction 11.1 and in the longitudinal press direction, the longitudinal direction 10, in this case according to FIG. 4b opposite the stop plate 14 applied to the cutting-side, lower, front end of the forming tube of the one.

FIG. 4b shows a first modified procedure in which the cross press stamp 5.1 already presses the loaf 100 located in the forming tube 100 in the cross press direction 11.1, as a first step, so to speak, whereby the side walls 1U1 and 1U2 can also still be at a greater distance from one another than the width b1 of this cross press stamp 5.1 and whereby, as shown, the matching longitudinal press stamp 4.1 can still be located outside the forming tube channel 1U.

In order for this to be able to enter the forming tube channel, the latter must have a sufficient extension in the first transverse direction 11.1, for which the transverse press die 5.1 must either not yet have moved far enough against the forming tube channel or must be moved back again for this purpose.

A second modified procedure is for the cross press stamp 5.1 to be the first to enter the forming tube channel, but only to the extent that it still has a greater extension in the cross press direction 11.1 than the selected longitudinal press stamp 4.1 in this direction, and the side walls have not yet been brought together to the correct distance B, so that the longitudinal press stamp 4.1, which according to FIG. 4b is still outside the forming tube 1, can now be moved into the forming tube 1, and only then are the side walls brought to their desired distance B and the pressing of the loaf 100 begins.

Then—as usual—the stop plate 14—which can best be seen in FIG. 5c—is brought to a predetermined distance from the lower, cutting end of the forming tube 1 with the loaf 100 pressed therein, corresponding to the desired slice thickness, and the blade 3 is moved in a transverse direction, here also the first transverse direction 11.1, in such a way that its cutting edge 3a completely smears over the cross section of the free space of the forming tube channel 1U and cuts off a slice 101 directly in front of the front lower end of the forming tube 1. For this purpose, the blade 3 rotating about the measuring axis 3' is adjusted together with the stop plate 14 in this transverse direction 11.1.

The selection of the stamps to be used for pressing and slicing can be partially or completely automated in that the machine itself analyzes, in particular measures, the loaf 100 to such an extent that the control of the machine can automatically select the correct cross press stamp and longitudinal press stamp, for which the loaf 100 must usually first be located in the machine, at least on the support surface 29, in order to be analyzed by corresponding sensors.

REFERENCE LIST 1 forming tube
1' forming tube cavity
1U forming tube channel
1U' channel cavity
1U1,1U2 side wall
1U3 bottom
1a cutting end
1b loading end
1.1, 1.2 forming tube opening
2 cutting device
3 blade
3' blade axis
3' blade plane
3a blade, cutting edge
4.1-4.5 longitudinal press stamp
5.1-5.6 cross press stamp
6 longitudinal press drive
6a motor
6b push rod
6c threaded spindle
6d spindle nut
6e guide rod
6f gearbox
6g tie rod
7 cross press drive
7a motor
7b push rod
7c threaded spindle
7d spindle nut
7e guide rod
7f gearbox
8 discharge conveyor
9 clutch
9a, b clutch part
10 axial direction, longitudinal direction, longitudinal press direction
10" longitudinal center plane
11 transverse direction, radial direction
11.1 1. transverse direction, transverse press direction
11.2 2. transverse direction
12 cutting position 13 longitudinal stamp turret
13' rotary axis, shift axis
14 stop element, stop plate
14' stop plane
14a functional edge
15a, b side wall guide
16 cube creel
16a, b creel blades
17 base frame
18 cutting base frame
19 slide
20 central lock
21.1/2 guide
22 guide
23 cross stamp turret
23' shift axle
24 driver
25a, b retaining ring
26 drive box
27 attachment part
28 operating unit
29 support surface
100 loaf
101 slice
A distance
B width forming tube channel
b1-b5 width of cross stamp

The invention claimed is:

1. A cutting machine for slicing a loaf of elastic material into slices, comprising:
a base frame,
a forming tube channel fixed in the base frame and extending in an axial direction, with an open longitudinal side and a channel cavity open at both ends,
at least one cross press stamp to fit into the open longitudinal side of the forming tube channel for forming a forming tube having a rear end and a cutting end,
a longitudinal press drive positioned in alignment with the forming tube and capable of applying a force in the axial direction for axially driving one of a plurality of longitudinal press stamps into the forming tube from the rear end and advancing and longitudinally pressing the loaf therein toward the cutting end of the forming tube,
a cutting device with a blade which is arranged in front of the cutting end of the forming tube and is displaceable in a transverse direction relative to the forming tube,
wherein
a width of the channel cavity of the forming tube channel is variable,
the at least one cross press stamp comprises a plurality of cross press stamps of different widths which can be inserted into the open longitudinal side of the forming tube channel, and
a cross press drive is provided for displacing a cross press stamp of the plurality of cross press stamps into the open longitudinal side of the forming tube channel in a first transverse direction, which is a transverse press direction.

2. The cutting machine according to claim 1, wherein
the width of the channel cavity is variable by moving at least one of two side walls of the forming tube channel in a second transverse direction perpendicular to a longitudinal center plane of the forming tube channel relative to a bottom of the forming tube channel.

3. The cutting machine according to claim 1, wherein
the longitudinal press drive can be coupled to and decoupled from one of the longitudinal press stamps and/or
the cross press drive can be coupled to and decoupled from one of the cross press stamps.

4. The cutting machine according to claim 1, wherein
the cross press stamps are detachably arranged on or in a rotatable cross stamp turret,
the cross stamp turret being rotatable in a controlled manner about a rotary axis parallel to the axial direction and spaced therefrom.

5. The cutting machine according to claim 4, wherein
the cross stamp turret is offset in the axial direction relative to the forming tube channel,
the cross stamp turret has a guide running in the axial direction for each cross press stamp, and the cross press drive has a guide running in the longitudinal direction for a cross press stamp,
the guide on the cross press drive can be brought into a position aligned with the guide of the cross stamp turret located in a cutting position,
the longitudinal press drive comprises a driver which can move in the axial direction and can be coupled to the cross stamp located in the cutting position in the cross stamp turret.

6. The cutting machine according to claim 5, wherein the longitudinal press drive comprises a push rod that is configured to be coupled to the driver, and the driver is configured to be coupled by displacement in a transverse direction to the cross stamp located in the cutting position in the cross stamp turret.

7. The cutting machine according to claim 1, wherein
the longitudinal press drive and/or the cross press drive and/or the blade are/is power-controllable in their/its movement.

8. The cutting machine according to claim 7, wherein only the longitudinal press drive and/or the cross press drive are/is power-controllable.

9. The cutting machine according to claim 1, wherein
the longitudinal press drive and/or the cross press drive comprise/comprises a ball screw or a threaded spindle, with the aid of which at least one push rod of the longitudinal press drive and/or the cross press drive can be moved in the pressing direction.

10. The cutting machine according to claim 1, wherein
the cross press drive and/or the longitudinal press drive are/is available only at a cutting position.

11. The cutting machine according to claim 1, wherein
the blade is either
a linearly movable blade, or
a rotatable blade, which is rotatable about a blade axis running parallel to the axial direction.

12. The cutting machine according to claim 11, wherein the blade is a finite belt-shaped blade or a finite plate-shaped blade.

13. The cutting machine according to claim 1, further comprising
a stop element provided for the loaf, wherein the stop element is arranged with its stop plane transverse to the axial direction, can be adjusted in the axial direction in front of the cutting end of the forming tube, and is coupled to a blade axis of the blade.

14. The cutting machine according to claim 13, wherein the stop element is adjustable relative to the blade not only in the axial direction but also in a radial direction relative to the blade axis and/or the stop element can be decoupled from the blade axis.

15. The cutting machine according to claim 1, wherein a respective longitudinal press stamp is detachably fastened to the longitudinal press drive, the respective longitudinal press stamp is detachably arranged on or in a rotatable longitudinal press turret, and the longitudinal press turret is rotatable in a controlled manner about a shift axis parallel to the axial direction of the forming tube and spaced therefrom.

16. The cutting machine according to claim 15, wherein the width of the channel cavity of the forming tube is adjustable to one of multiple trough widths, and the respective longitudinal press stamp matches the one trough width.

17. A method of slicing a loaf with a cutting machine having a forming tube channel that extends in an axial direction, the method comprising:

selecting one of several cross press stamps to press the loaf in a direction transverse to the axial direction, coupling the one cross press stamp to a cross press drive of the cutting machine, inserting the one cross press stamp into the forming tube channel, and adjusting an inner width of the forming tube channel to a width of the one cross press stamp.

18. The method according to claim 17, wherein the one cross press stamp is brought into a cutting position, and is brought into contact with the cross press drive by a longitudinal press drive of the cutting machine.

19. The method according to claim 18, wherein for gripping and displacing the one cross press stamp brought into the cutting position, a driver is detachably arranged on a longitudinal stamp turret of the cutting machine, which driver is coupled by a push rod of the longitudinal press drive and is used for gripping the one cross press stamp.

20. The method according to claim 17, wherein for cutting the loaf into cubes the forming tube channel and the one cross press stamp inserted therein are moved away from a blade plane of the cutting machine, and a cube creel is inserted into a resulting intermediate space and is fastened to a lower end of the forming tube channel on a cutting side, wherein the forming tube channel is moved away from the blade plane by a longitudinal press drive of the cutting machine.

* * * * *